US012772196B2

(12) United States Patent
Kumar et al.

(10) Patent No.: US 12,772,196 B2
(45) Date of Patent: Oct. 20, 2026

(54) UPLINK BASED POSITIONING DURING DEMODULATED REFERENCE SIGNAL BUNDLING

(71) Applicant: QUALCOMM Incorporated, San Diego, CA (US)

(72) Inventors: Akash Kumar, Hyderabad (IN); Stephen William Edge, Escondido, CA (US); Hargovind Prasad Bansal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 18/462,698

(22) Filed: Sep. 7, 2023

(65) Prior Publication Data

US 2025/0089003 A1 Mar. 13, 2025

(51) Int. Cl.

*H04W 64/00* (2009.01)
*H04L 5/00* (2006.01)
*H04W 52/36* (2009.01)

(52) U.S. Cl.

CPC ........... *H04W 64/00* (2013.01); *H04L 5/0051* (2013.01); *H04W 52/367* (2013.01)

(58) Field of Classification Search

CPC . H04W 64/00; H04W 52/367; H04W 52/283; H04W 52/247; H04W 52/325;

(Continued)

(56) References Cited

U.S. PATENT DOCUMENTS

2015/0351044 A1* 12/2015 Boudreau ........... H04W 52/243 370/329
2019/0349868 A1* 11/2019 Zhang ................... H04L 5/0051

(Continued)

FOREIGN PATENT DOCUMENTS

WO 2022151009 7/2022
WO 2022152207 A1 7/2022

(Continued)

OTHER PUBLICATIONS

International Search Report and Written Opinion—PCT/US2024/043178—ISA/EPO—Feb. 24, 2025.

(Continued)

*Primary Examiner* — Wesley L Kim
*Assistant Examiner* — Erkin Abdullaev
(74) *Attorney, Agent, or Firm* — Procopio, Cory, Hargreaves & Savitch LLP

(57) ABSTRACT

Techniques are provided for handling uplink based positioning during demodulated reference signal (DMRS) bundling. An example method for transmitting positioning reference signals and demodulated reference signal bundles includes determining a first transmit power for transmitting an uplink positioning reference signal, determining a second transmit power for transmitting a demodulated reference signal bundle, determining a common transmit power based at least in part on the first transmit power and the second transmit power, wherein the common transmit power is configured to maintain phase continuity in the demodulated reference signal bundle, and transmitting the uplink positioning reference signal and the demodulated reference signal bundle with the common transmit power.

30 Claims, 20 Drawing Sheets

(58) Field of Classification Search
CPC ... H04W 52/146; H04L 5/0051; H04L 5/0048
See application file for complete search history.

(56) References Cited

U.S. PATENT DOCUMENTS

| | | | | |
|---|---|---|---|---|
| 2022/0368496 | A1 | 11/2022 | Shreevastav et al. | |
| 2023/0076490 | A1 | 3/2023 | Bao et al. | |
| 2023/0092533 | A1* | 3/2023 | Bae | H04L 5/001 370/329 |
| 2023/0216632 | A1* | 7/2023 | Go | H04L 5/0051 370/329 |

FOREIGN PATENT DOCUMENTS

| | | | | |
|---|---|---|---|---|
| WO | 2023086721 | A1 | 5/2023 | |
| WO | WO-2024035708 | A1 * | 2/2024 | H04W 52/38 |

OTHER PUBLICATIONS

Partial International Search Report—PCT/US2024/043178—ISA/EPO—Dec. 2, 2024.

* cited by examiner

UPLINK BASED POSITIONING DURING DEMODULATED REFERENCE SIGNAL BUNDLING

BACKGROUND

Field of the Disclosure

The field of the disclosure relates to wireless communications, and more particularly, to techniques for handling uplink based positioning during demodulated reference signal (DMRS) bundling.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, or the like, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

In some cases, a transmitter, such as a UE or a base station, may transmit one or more demodulation reference signals (DMRSs) to a receiver, such as another UE or base station, which the receiver may use to perform a channel estimation to facilitate demodulation of communications received from the transmitter. In some cases, the transmitter may associate or bundle a plurality of time-domain resources for purposes of DMRS bundling, in which case the receiver may assume that the same precoder is used across the plurality of time-domain resources and that DMRS transmissions across the plurality of time-domain resources may be coherently filtered to increase the accuracy of the channel estimation. The implementation of DMRS on a UE may impact the performance of uplink positioning techniques because the coherency of the DMRS transmissions may be negatively impacted by variations in transmitted signal parameters (e.g., transmit power).

SUMMARY

An example method for obtaining uplink positioning reference signal measurements according to the disclosure includes receiving an indication that a user equipment is configured to utilize demodulated reference signal bundling in uplink communications, determining a duration of a positioning session, providing an indication to suspend demodulated reference signal bundling for the duration of the positioning session, and obtaining signal measurement values based on one or more uplink positioning reference signals transmitted by the user equipment during the positioning session.

An example method for receiving uplink positioning reference signals according to the disclosure includes receiving an indication to perform a positioning session with a user equipment, fragmenting one or more demodulated reference signal bundles transmitted by the user equipment during the positioning session, and receiving an uplink positioning reference signal from the user equipment within a fragment of the one or more demodulated reference signal bundles.

An example method for transmitting positioning reference signals and demodulated reference signal bundles according to the disclosure includes determining a first transmit power for transmitting an uplink positioning reference signal, determining a second transmit power for transmitting a demodulated reference signal bundle, determining a common transmit power based at least in part on the first transmit power and the second transmit power, wherein the common transmit power is configured to maintain phase continuity in the demodulated reference signal bundle, and transmitting the uplink positioning reference signal and the demodulated reference signal bundle with the common transmit power.

An example method for receiving uplink positioning reference signals according to the disclosure includes providing demodulated reference signal bundling configuration information to a user equipment, receiving a positioning session request from a location server, determining a status of signals within demodulated reference signal bundles transmitted by the user equipment, transmitting an uplink cancellation indication to the user equipment based at least in part on the status of the signals, and receiving one or more uplink positioning reference signals from the user equipment.

An example method for configuring aperiodic uplink positioning reference signals according to the disclosure includes receiving a positioning session request associated with a user equipment, determining a schedule for one or more demodulated reference signal bundles transmitted by the user equipment, providing a configuration for aperiodic transmissions of uplink positioning reference signals to the user equipment, and transmitting a trigger signal to the user equipment based on the schedule for the one or more demodulated reference signal bundles, wherein the user equipment is configured to transmit an uplink positioning reference signal in response to receiving the trigger signal.

DETAILED DESCRIPTION

Figure 1:
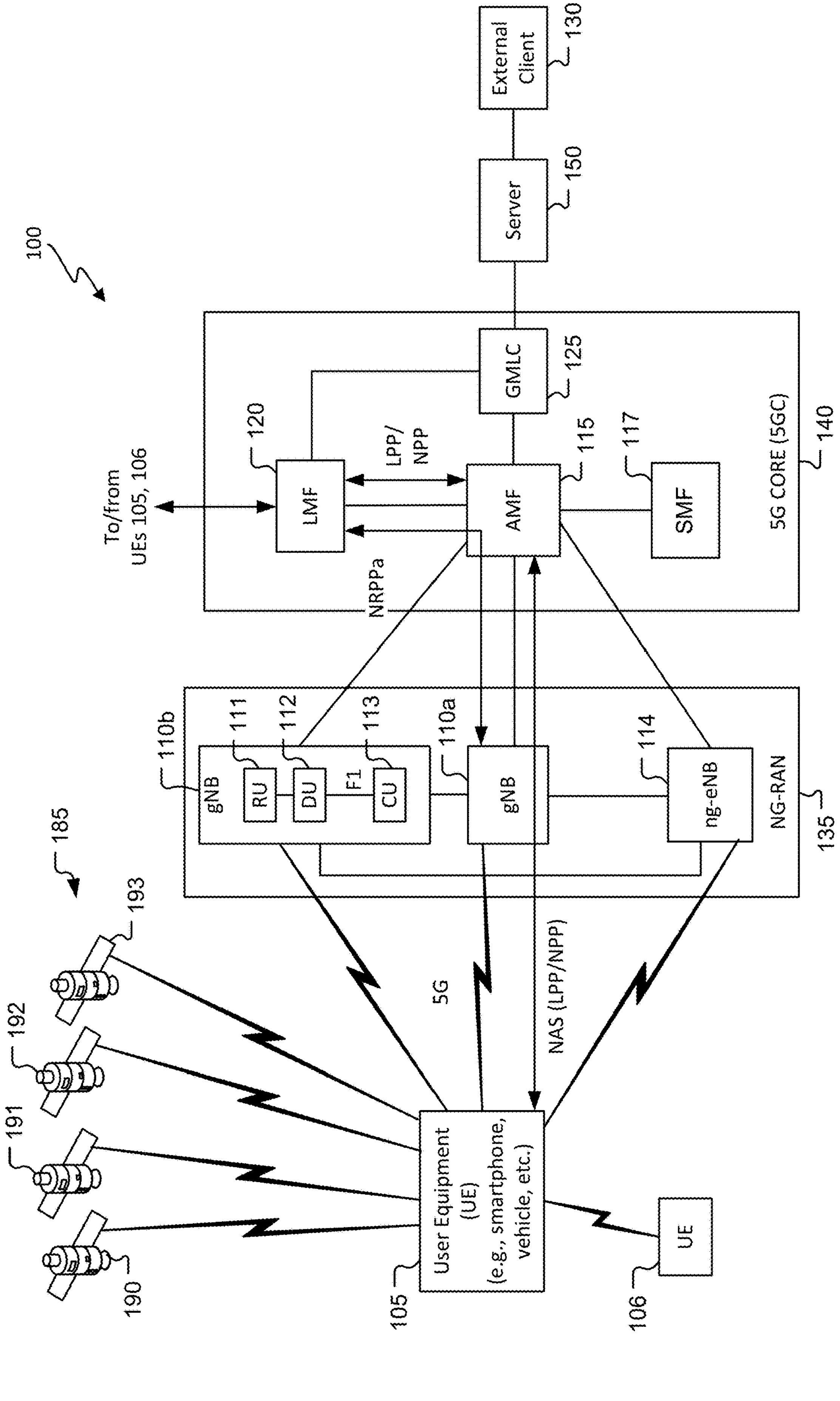
FIG. 1 is a simplified diagram of an example wireless communications system.

Various aspects relate generally to wireless communications, and more particularly, to techniques for handling uplink based positioning during DMRS bundling. In general, a user equipment (UE) may be required to maintain phase continuity across DMRS in different uplink slots (e.g., physical uplink shared channel (PUSCH)) within a DMRS bundle. A positioning session may be scheduled concurrently with one or more DMRS bundles. The positioning session may utilize uplink positioning methods, such as uplink time difference of arrival (UL-TDOA) and round trip time (RTT) measurements, which require transmitting uplink signals (e.g., Pos SRS) at higher transmission powers than the power required for the concurrent DMRS bundle. Varying the transmission power during the DMRS bundling may disrupt the phase continuity of the bundle and thus decrease the benefits of DMRS bundling. The techniques provided herein maintain the phase continuity requirements of a DMRS bundle during a concurrent positioning session.

In an example, a UE may be configured to indicate an ability to support DMRS bundling to a location server (LS) (e.g., a capability exchange). The LS may be configured to negotiate with one or more base stations (e.g., the serving gNode B(s)) to suspend DMRS bundling during a positioning session in which uplink positioning signals are to be measured. In an example, a base station may be configured to create fragments of PUSCH DMRS bundles, and a UE may be configured to transmit uplink positioning signals (e.g., Pos SRS) within holes in the DMRS bundles and with the same transmission power as the DMRS bundles. In an example, the LS may be configured to define a positioning timeout parameter for a positioning session, and suspending or fragmenting the DMRS bundles may be based at least in part on the positioning timeout parameter. In an example, a UE may be configured to determine a common transmit power for both the uplink positioning signals and the DMRS bundles, and then utilize the common transmit power for transmitting uplink positioning signals and transmitting the DMRS bundles. The common transmit power may be based on allowed uncertainties for transmitting PUSCH and Pos SRS and both of the respective transmit powers may be modified to the common transmit power. In an example, a UE may be configured to transmit a UE Assistance Information (UAI) message requesting suspension of DMRS bundling during a positioning session. In an example, a base station (e.g., serving gNodeB (gNB)) may configure the UE with UpLink Cancellation Indication (ULCI) Downlink Control Information (DCI) monitoring. The base station may then be configured to cancel the remaining PUSCH in a DMRS bundle to accommodate the transmission of one or more Pos SRS. In an example, the base station may be configured to determine how much of the PUSCH in a DMRS bundle has been transmitted and then utilize the ULCI to cancel the remaining PUSCH in view of the positioning timeout parameter. Other configurations, however, may be used.

Particular aspects of the subject matter described in this disclosure may be implemented to realize one or more of the following potential advantages. In some examples, by coordinating the transmissions of uplink positioning signals with DMRS bundles, the described techniques can be used to meet the phase continuity requirements during DMRS bundling. Additionally, techniques improve the reliability and positioning performance of uplink positioning techniques in the presence of a DMRS bundling schedule by improving Pos SRS detections at base stations in a network. Other advantages may also be realized.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on. Two or more UEs may communicate directly in addition to or instead of passing information to each other through a network.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110*a*, 110*b* and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110*a*, 110*b* and/or the ng-eNB 114 may be configured to communicate with the UE 105 via multiple carriers. Each of the gNBs 110*a*, 110*b* and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple ULEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output)

devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110*a*, 110*b* and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LIMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LIMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
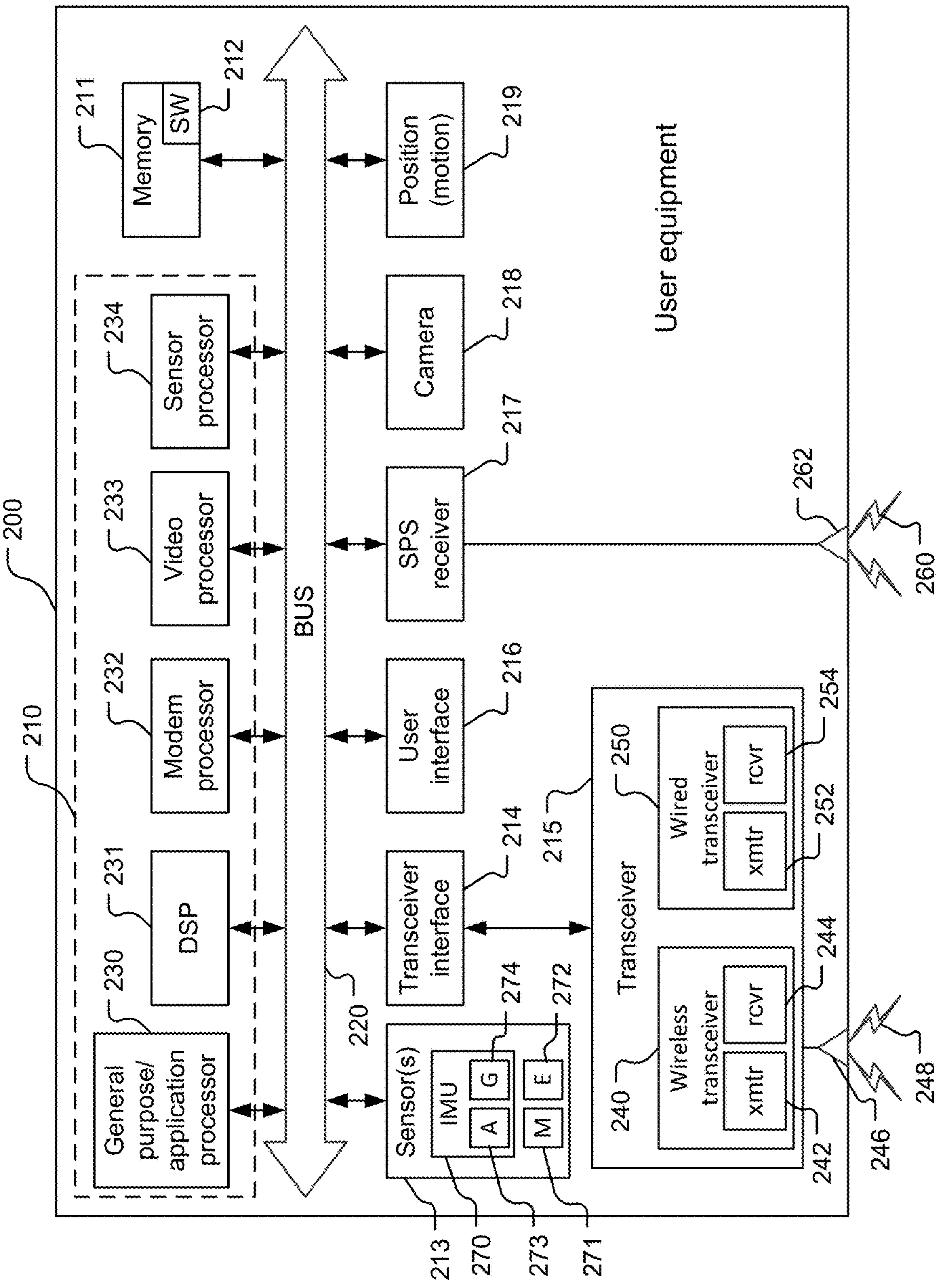
FIG. 2 is a block diagram of components of an example user equipment.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise, for example, one or more accelerometers 273 (e.g., collectively responding to acceleration of the UE 200 in three dimensions) and/or one or more gyroscopes 274 (e.g., three-dimensional gyroscope(s)).

The sensor(s) 213 may include the one or more magnetometers 271 (e.g., three-dimensional magnetometer(s)) to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations. The sensor(s) 213 may comprise one or more of other various types of sensors such as one or more optical sensors, one or more weight sensors, and/or one or more radio frequency (RF) sensors, etc.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and the gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs)

such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc.

New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
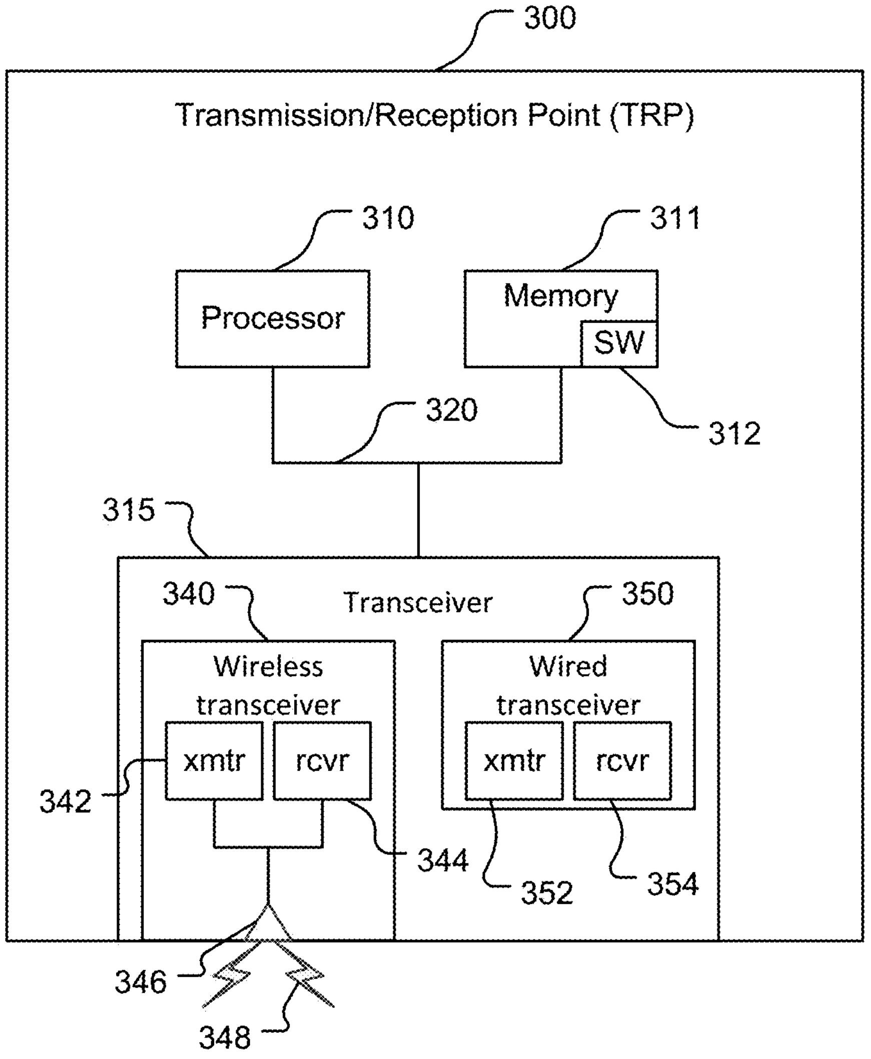
FIG. 3 is a block diagram of components of an example transmission/reception point.

Referring also to FIG. 3, an example of a TRP 300 of the gNBs 110*a*, 110*b* and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110*a*, 110*b* and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
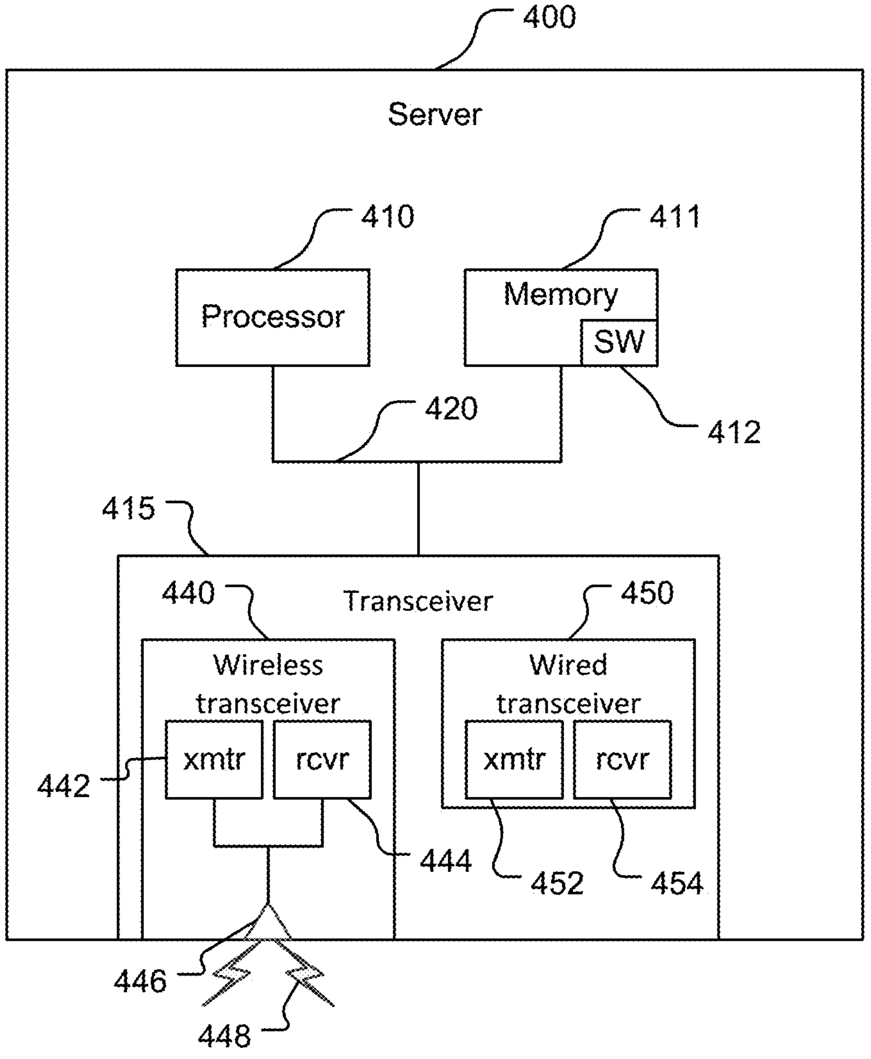
FIG. 4 is a block diagram of components of a server, various examples of which are shown in FIG. 1.

Referring also to FIG. 4, a server 400, of which the LIMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning (Pos SRS), i.e., UL-PRS) to the one or more base stations (e.g., when instructed by its serving base station) and may include the time difference $T_{Rx \rightarrow Tx}$ (i.e., UE TRx-Tx or UERx-Tx) between the ToA of the RTT measurement signal and the transmission time of the RTT response message in a payload of each RTT response message. The RTT response message would include a reference signal from which the base station can deduce the ToA of the RTT response. By comparing the difference $T_{Tx \rightarrow Rx}$ between the transmission time of the RTT measurement signal from the base station and the ToA of the RTT response at the base station to the UE-reported time difference $T_{Rx \rightarrow Tx}$, and subtracting the UERx-Tx, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning (Pos SRS)). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequency-Layer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest sub-carrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every Nth resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send Pos SRS that are received by multiple TRPs. A sounding reference signal for positioning may be referred to as a Pos SRS or an Pos SRS signal. In 5G multi-RTT, coordinated positioning may be used with the UE sending a single Pos SRS for positioning that is received by multiple TRPs instead of sending a separate Pos SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the Pos SRS for positioning signal in a PRS/Pos SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/Pos SRS for positioning signal pair may be transmitted from the TRP and the UE, respectively, within about 10 ms of each other. With Pos SRS for positioning being sent by UEs, and with PRS and Pos SRS being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence). Position information may include one or more positioning signal measurements (e.g., of one or more satellite signals, of PRS, and/or one or more other signals), and/or one or more values (e.g., one or more ranges (possibly including one or more pseudoranges), and/or one or more position estimates, etc.) based on one or more positioning signal measurements.

Figure 5:
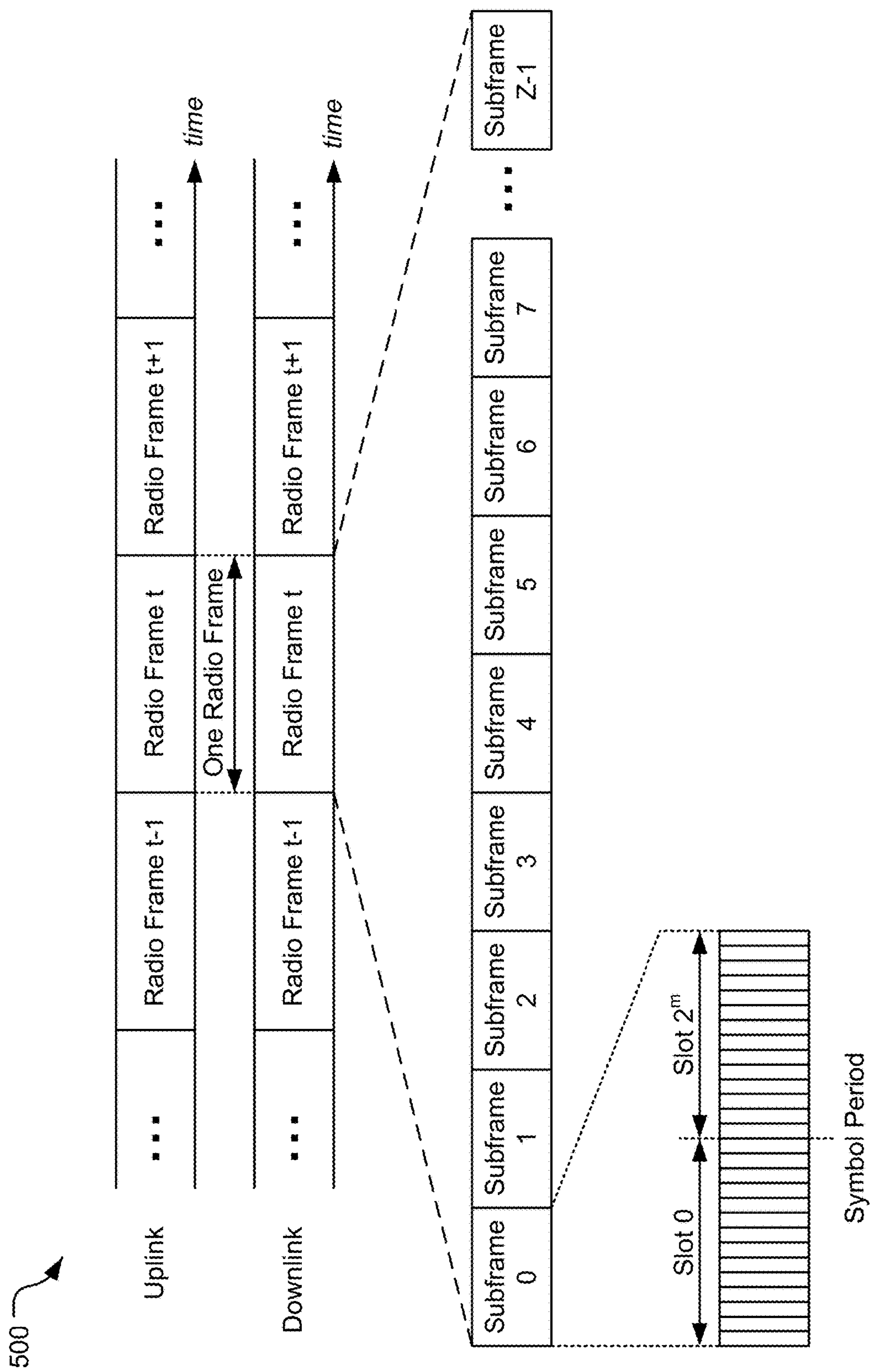
FIG. 5 is a block diagram illustrating an example frame structure for use in a wireless network.

Referring to FIG. 5, a block diagram illustrating an example frame structure 500 for use in a wireless network is shown. For example, the frame structure 500 may be used for frequency division duplexing (FDD) in a communications system (e.g., the communications system 100). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z ($Z \geq 1$) subframes (for example, with indices of 0 through $Z-1$). Each subframe may have a predetermined duration (for example, 1 ms) and may include a set of slots (for example, 2 m slots per subframe are shown in FIG. 5, where m is the numerology used for a transmission, such as 0, 1, 2, 3, 4, among other possibilities/examples). Each slot may include a set of L symbol periods. Each slot may include fourteen symbol periods (for example, as shown in FIG. 5), seven symbol periods, or another quantity of symbol periods. In a case where the subframe includes two slots (for example, when $m=1$), the subframe may include 2L symbol periods, where the 2L symbol periods in each subframe may be assigned indices of 0 through $2L-1$. In some aspects, a scheduling unit for the FDD may be frame-based, subframe-based, slot-based, symbol-based, among other possibilities/examples.

While some techniques are described herein in connection with frames, subframes, slots, or the like, or combinations thereof, these techniques may equally apply to other types of wireless communication structures, which may be referred to using terms other than "frame," "subframe," "slot," or the like, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 5 may be used.

In operation, a base station such as the gNB 110*a* may transmit synchronization signals. For example, the gNB 110*a* may transmit a primary synchronization signal (PSS), a secondary synchronization signal (SSS), or the like, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

Figure 6:
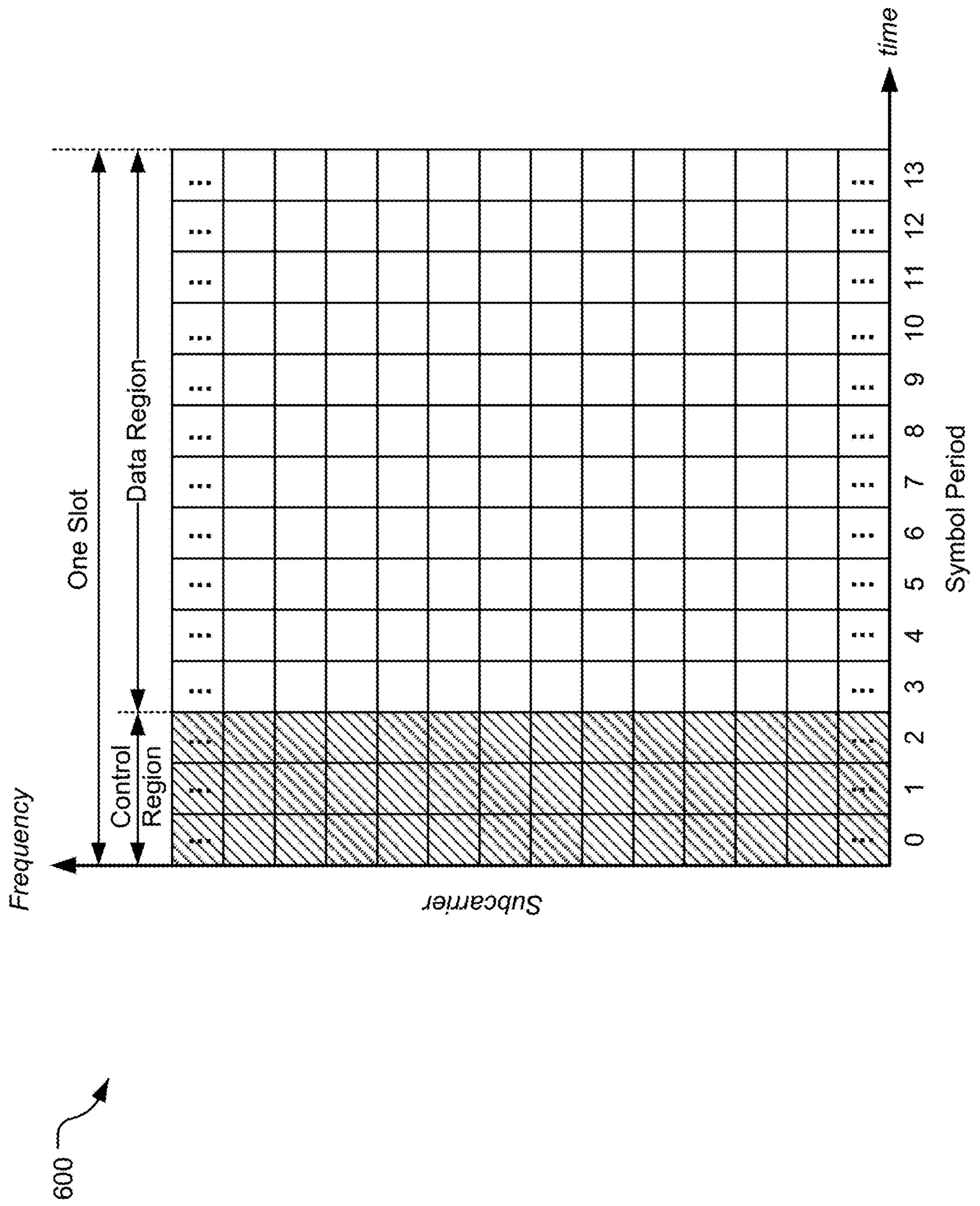
FIG. 6 is a block diagram illustrating an example slot format.

Referring to FIG. 6, a block diagram illustrating an example slot format 600 is shown. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in the communication system 100. For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE, such as the UE 200, may be located within the coverage of multiple BSs (e.g., gNBs 110*a*, 110*b*). One of these BSs may be selected to serve the UE. The serving BS may be selected based at least in part on various criteria such as received signal strength, received signal quality, path loss, or the like, or combinations thereof. Received signal quality may be quantified by a signal-to-noise-and-interference ratio (SNIR), or a RSRQ, or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such as distributed units.

As indicated above, a transmitter, such as a UE or a BS, may transmit one or more DMRSs to a receiver such as another UE or BS. A DMRS may include a reference signal that is generated from a base sequence, such as a Zadoff-Chu sequence or a Gold sequence. The receiver may perform one or more measurements of the DMRS to estimate a physical channel on which one or more communications are transmitted from the transmitter. In this way, the UE may determine whether a channel quality of the physical channel satisfies one or more channel quality thresholds, and may use the results from the one or more measurements to facilitate demodulation of the communications transmitted on the physical channel.

In some cases, the transmitter may associate or bundle a plurality of time-domain resources for purposes of DMRS bundling, in which case the receiver may assume that the same precoder is used across the plurality of time-domain resources and that DMRS transmissions across the plurality of time-domain resources may be coherently filtered to increase the accuracy of the channel estimation. A transmitter may transmit, to a receiver, an indication that a plurality of time-domain resources are associated for purposes of DMRS bundling. In some aspects, the transmitter may further transmit an indication of a DMRS bundling configuration for the plurality of time-domain resources, or the receiver may be hard coded with the DMRS bundling configuration. In this way, the receiver may determine DMRS patterns of DMRS transmissions for the plurality of time-domain resources based at least in part on the indication that the plurality of time-domain resources are associated for purposes of DMRS bundling and the DMRS bundling configuration. This permits the receiver to identify the DMRS transmissions, to perform a channel estimation of a physical channel on which the transmitter is to transmit one or more communications, and to use the channel estimation to facilitate demodulation of the one or more communications.

Figure 7:
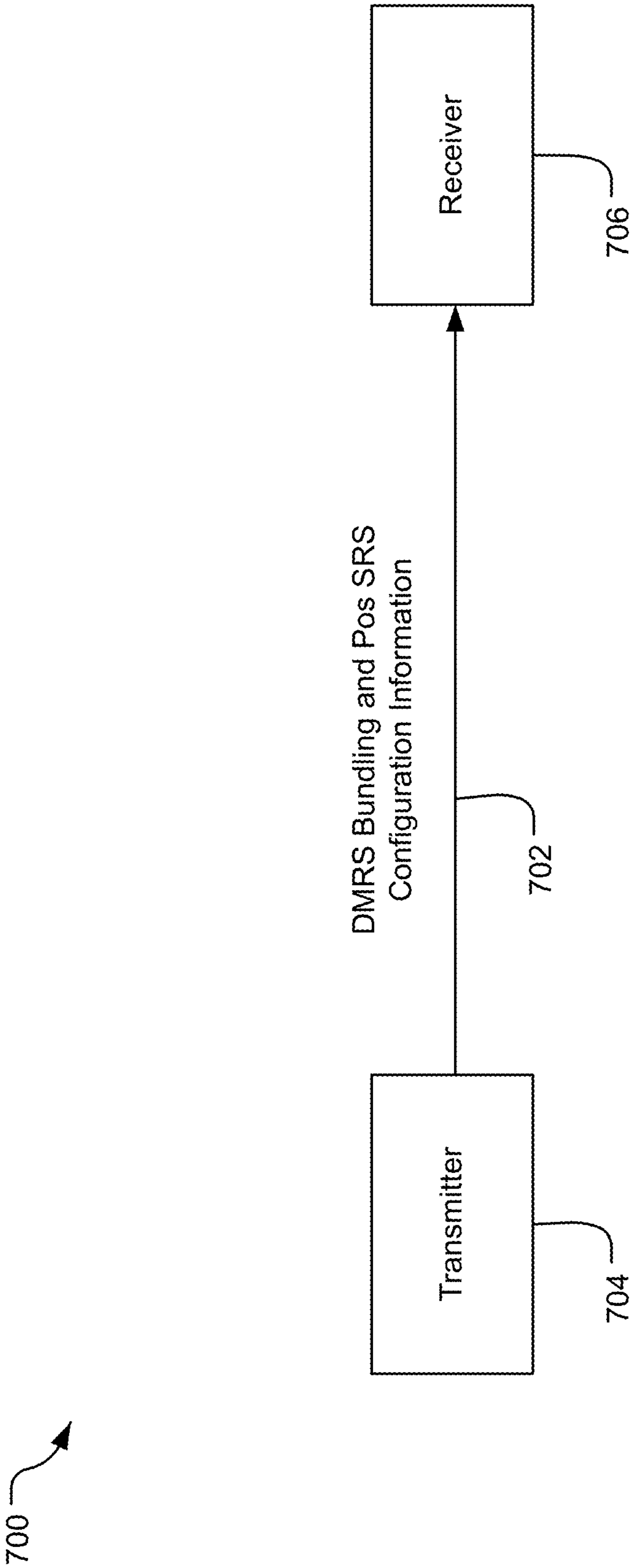
FIG. 7 is a block diagram of messaging for configuring DMRS bundling and positioning reference signals.

Referring to FIG. 7, a block diagram 700 of messaging for configuring DMRS bundling and Pos SRS is shown. In a first operation 702, a transmitter 704 may transmit an indication of DMRS bundling and Pos SRS to a receiver 706 such that the receiver 706 is informed that a plurality of time-domain resources are associated for purposes of DMRS bundling and uplink positioning. Moreover, the transmitter 704 may transmit indications of a DMRS bundling configuration for DMRS bundling and uplink positioning (e.g., Pos SRS Resource Set) in the plurality of time-domain resources.

In some aspects, the transmitter 704 may be a gNB 110*a* configured to transmit the indications of DMRS bundling and Pos SRS configurations in one or more signaling communications. The one or more signaling communications may include, for example, one or more master information blocks (MIBs), one or more SIBs, one or more PBCH communications, one or more PDCCH communications, one or more PDSCH communications, one or more radio resource control (RRC) communications, one or more downlink control information (DCI) communications, one or more medium access control (MAC) control element (MAC-CE) communications, or the like, or a combination thereof. The receiver 706 may be the UE 105 configured to transmit capabilities information indicating that the receiver 706 supports DMRS bundling and/or uplink positioning. In such examples, the transmitter 704 may transmit the indications of DMRS bundling and Pos SRS configurations based at least in part on receiving the capabilities information.

The indications of DMRS bundling and Pos SRS configurations may include an indication of the plurality of time-domain resources and an indication that the plurality of time-domain resources are associated for purposes of DMRS bundling and uplink positioning (e.g., Pos SRS Resource Sets). Each time-domain resource of the plurality of time-domain resources may include a slot, a mini-slot, a portion of a slot (such as one or more OFDM symbols), a transmission time-interval (TTI), or a time-domain scheduling allocation, among other possibilities or examples. Accordingly, the plurality of time-domain resources may include a plurality of slots, a plurality of mini-slots, a plurality of portions of a slot (such as a plurality of OFDM symbols), a plurality of TTIs, a plurality of time-domain scheduling allocations, or a combination thereof, among other possibilities or examples. In some aspects, the indication of the plurality of time-domain resources may include a scheduling grant associated with the plurality of time-domain resources, may include an indication of a starting time-domain resource and an ending time-domain resource of a time-domain resource range that includes the plurality of time-domain resources, among other possibilities/examples. In an example, the Pos SRS configurations may include a positioning timeout parameter indicating a time period for the transmission of uplink positioning signals. Other timing and resource information may be included in the first operation 702.

The indication that the plurality of time-domain resources are associated for purposes of DMRS bundling may be an explicit indication or an implicit indication. An explicit indication that the plurality of time-domain resources are associated for purposes of DMRS bundling may include, for example, a value, a field, a flag, among other possibilities/examples, included in the one or more communications that indicate the plurality of time-domain resources are associated for purposes of DMRS bundling. In some aspects, an implicit indication that the plurality of time-domain resources are associated for purposes of DMRS bundling may include an indication that the plurality of time-domain resources are associated with the same scheduling grant or a set of consecutive scheduling grants. In some aspects, an implicit indication that the plurality of time-domain resources are associated for purposes of DMRS bundling may include an indication that the plurality of time-domain resources are associated with the same frequency-domain allocation (for example, that the plurality of time-domain resources span the same frequency-domain resources).

In some aspects, an implicit indication that the plurality of time-domain resources are associated for purposes of DMRS bundling may include an indication that the plurality of time-domain resources all have the same time-domain resource allocation length. For example, each time-domain resource allocation may span a full slot, or may span the same quantity of symbols of respective slots, among other possibilities/examples. In some aspects, an implicit indication that the plurality of time-domain resources are associated for purposes of DMRS bundling may include an indication that the plurality of time-domain resources are associated with the same physical channel mapping type, such as PDSCH Type A, PDSCH Type B, PUSCH Type A, or PUSCH Type B, among other possibilities/examples. The physical channel mapping type may indicate a location of a DMRS transmission and a scheduled resource (for example, a PUSCH or PDSCH resource) in a particular slot. A Type A mapping may indicate, for example, that a location of a front-loaded DMRS (the first DMRS in a particular slot or another type of time-domain resource) is based at least in part on a quantity of symbols between the first symbol of the slot and a last symbol of the scheduled resource. A Type B mapping may indicate, for example, that a location of a front-loaded DMRS is based at least in part on a first symbol and a last symbol of the scheduled resource.

The DMRS bundling and Pos SRS configurations may include indications of one or more DMRS bundling and Pos SRS parameters for determining the DMRS and Pos SRS patterns associated with each time-domain resource of the plurality of time-domain resources. The DMRS and Pos SRS patterns associated with particular time-domain resources may include the locations of DMRS and Pos SRS transmissions in the time-domain resource, or the quantity of DMRS or Pos SRS transmissions in the time-domain resource, among other possibilities/examples.

Figure 8B:
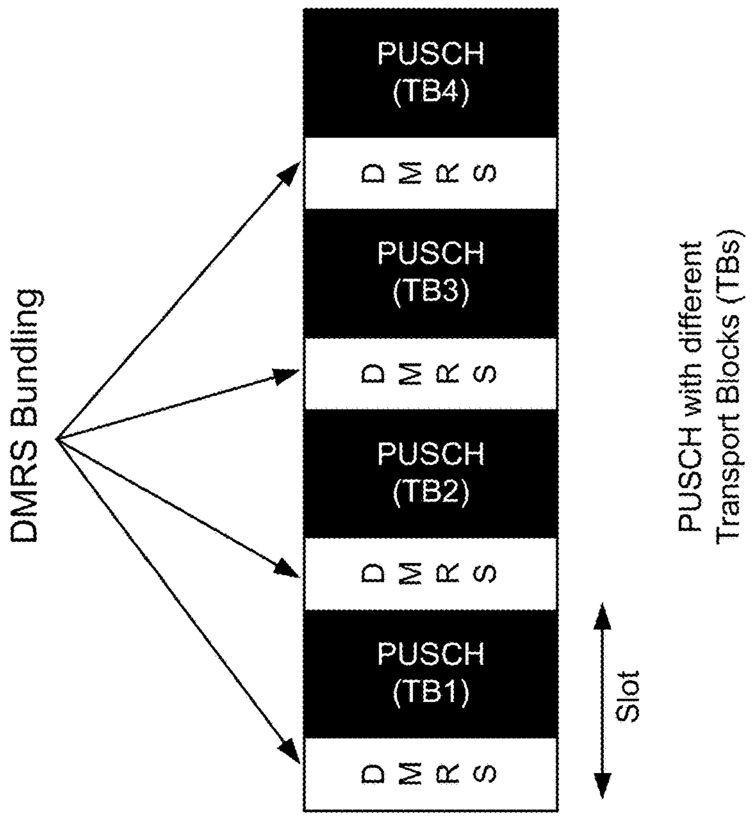
FIGS. 8A and 8B illustrate example scenarios of DMRS bundling.
Figure 8A:
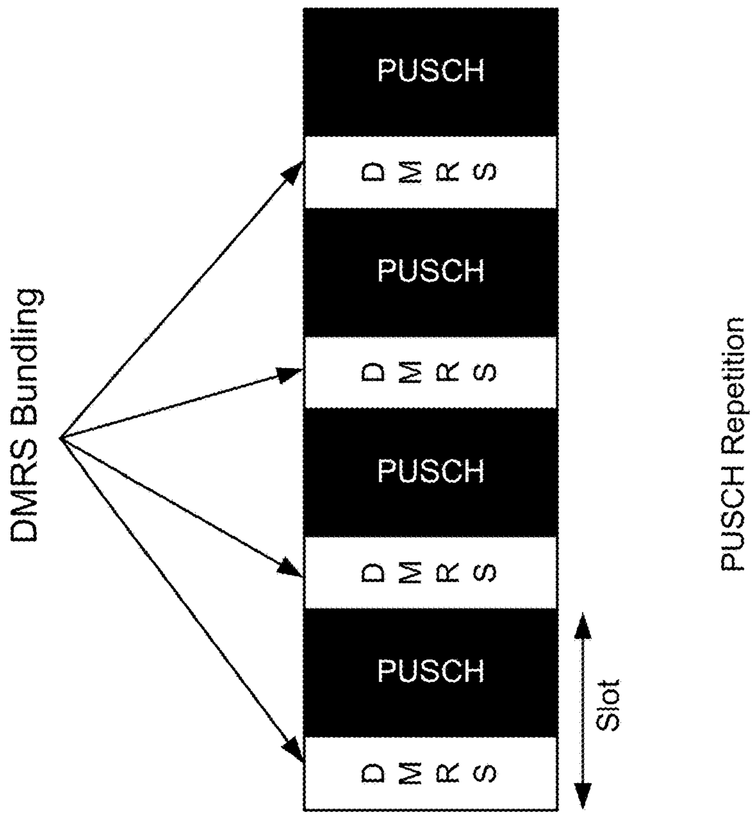

Referring to FIGS. 8A and 8B, example scenarios for DMRS bundling are shown. In an example, DMRS bundling may be enabled across PUSCH repetitions. The same or coherent DMRS is sent in multiple time slots enables a base station to consider multiple DMRS when performing channel estimation. The enhanced channel estimating may further improve the chances of successful decoding of the uplink transmission. Referring to FIG. 8A, PUSCH/PUCCH DMRS bundling may be applied to a PUSCH repetition over multiple PUSCH repetitions carrying a same transport blocks (TB), or carrying different TBs as shown in FIG. 8B. PUSCH DMRS bundling typically relies on phase continuity across PUSCH symbols.

Phase discontinuity may arise based on non-contiguous (time) resource allocation. Phase discontinuity may also arise when a timing gap between PUSCH symbols is larger than a threshold, and/or when other UL channels/signals (e.g., PUCCH, sounding reference signals (SRS) etc.) or DL channels/signals (e.g., PDCCH, PDSCH, synchronization signal block (SSB), channel state information (CSI) reference signals (RS), etc.) are sent during the gap. Phase discontinuity may further arise when different frequency resource allocations are configured for PUSCH symbols, different transmit power, and/or different transmit waveform. For example, transmitting uplink positioning reference signals (e.g., UL-PRS, Pos SRS) within a DMRS bundle may create phase discontinuity based on the increased transmission power associated with uplink positioning signals (e.g., so they may be received by multiple stations).

Figure 9:
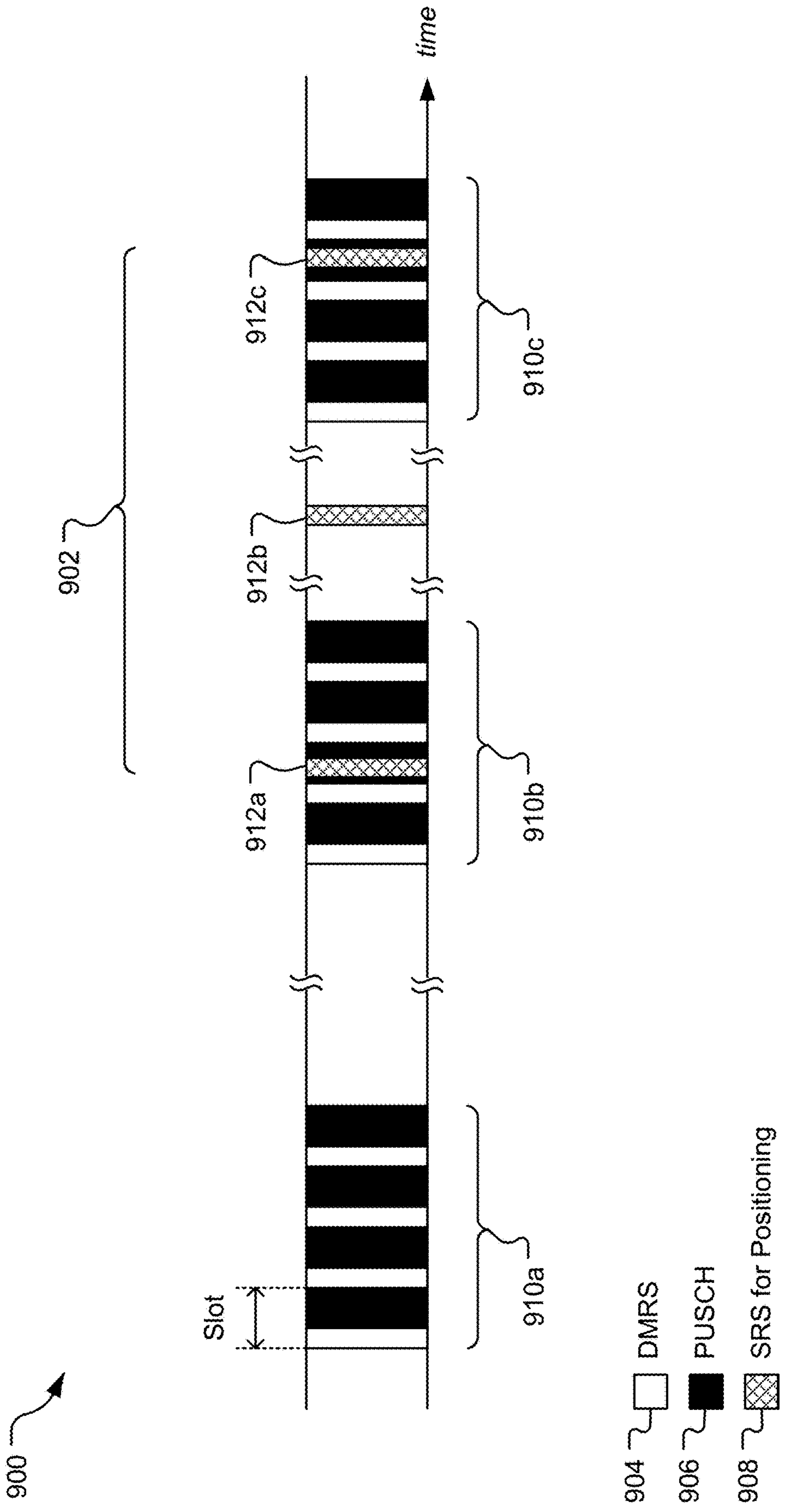
FIG. 9 is an example slot diagram including interleaved resources configured for DMRS bundling and sounding reference signals for positioning (Pos SRS).

Referring to FIG. 9, an example slot diagram 900 including interleaved resources configured for DMRS bundling and Pos SRS is shown. The slot diagram 900 may be based on the DMRS bundling and Pos SRS configuration information described in FIG. 7. The slot diagram 900 depicts relative timing for DMRS resources 904, PUSCH resources 906, and Pos SRS resources 908. The resource types, the numbers of resource types, and the relative locations of the resources in the slot diagram 900 are examples, and not limitations, as other resource configurations may be used. In an example, the UE 105 may provide one or more capabilities messages (or other information elements (IEs)) to a network resource, such as the LMF 120 (e.g., a location server) to indicate the UE 105 is configured to support DMRS bundling, and the network resource may provide relevant DMRS configuration information to a serving base station, such as the gNB 110*a*. For example, the DMRS configuration information may include timing/slot information for one or more DMRS bundles, such as a first DMRS bundle 910*a*, a second DMRS bundle 910*b*, and a third DMRS bundle 910*c*. The content and configurations of the DMRS bundles 910*a-c* are examples, and other configurations may be used. For example, the DMRS bundles 910*a-c* may be configured as a single DMRS bundle which spans the duration of the slot diagram 900. The LMF 120 may subsequently schedule a positioning session (e.g., based on internal or external requests) during which the UE 105 may be required to transmit uplink positioning signals such as Pos SRS (e.g., to support TDOA, RTT, or other positioning methods). For example, the LMF 120 may define a positioning timeout value 902 to define a time period in which Pos SRS signals, such as a first Pos SRS 912*a*, a second Pos SRS 912*b*, and a third Pos SRS 912*c* are to be transmitted. The Pos SRS 912*a-c* in the slot diagram 900 are examples and are provided to illustrate a possible timing overlap between DMRS bundling and a positioning session.

Figure 10:
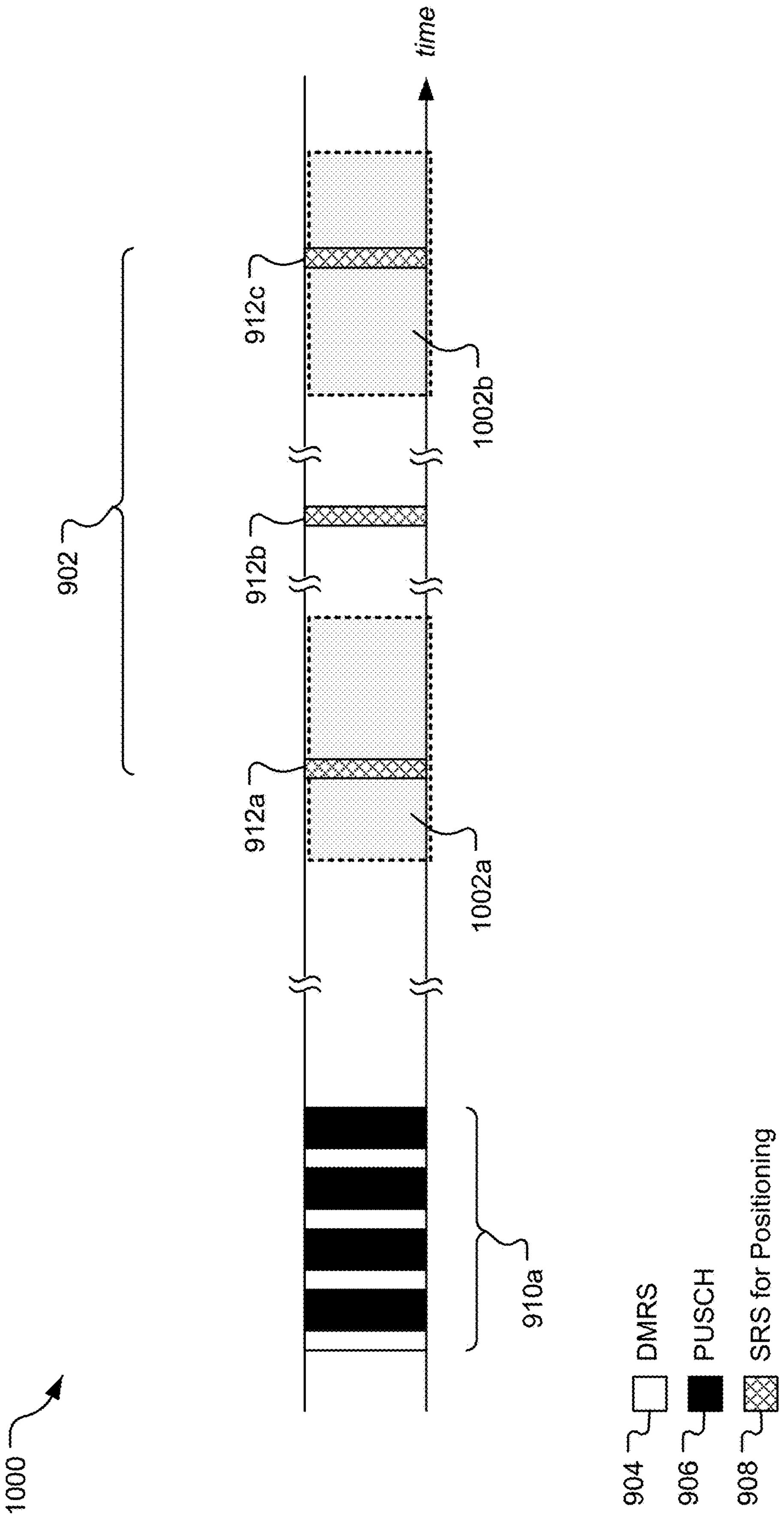
FIG. 10 is an example slot diagram with suspended DMRS bundles and Pos SRS.

Referring to FIG. 10, with further reference to FIG. 9, an example slot diagram 1000 with suspended DMRS bundles and Pos SRS is shown. In operation, in an example, the LMF 120 may be configured to negotiate with the gNB 110*a* over NRPPa to suspend the DMRS bundling by specifying the time over which uplink positioning measurements are to be collected (e.g., as a function of the positioning timeout value 902). For example, the slot diagram 1000 includes a first suspended DMRS bundle 1002*a* corresponding to the suspension of the second DMRS bundle 910*b*, and a second suspended DMRS bundle 1002*b* corresponding to the suspension of the third DMRS bundle 910*c*. The suspended DMRS bundles 1002*a-b* will enable the UE 105 to transmit first Pos SRS 912*a* and the third Pos SRS 912*c* at a requested beam configuration (e.g., at a higher transmit power as compared to the DMRS bundles). The suspension of the DMRS bundles may adversely affect the latency of the PUSCH data flow to enable a higher quality position estimate based on the higher power Pos SRS transmissions. The LMF 120 may be configured to utilize the suspension technique described in FIG. 10 for use cases when a high quality position estimate is required (e.g., determining a location of the UE 105 in response to an emergency or other alert).

In other use cases, such as when the UE 105 is in a deep coverage limited region, the LMF 120 and gNB 110*a* may be configured to create fragments of PUSCH DMRS bundles with holes in between for the transmission of the Pos SRS. For example, referring to FIG. 9, holes may be created in the PUSCH resources 906 to accommodate the first Pos SRS 912*a* and the third Pos SRS 912*c*. In an example, the Pos SRS configuration may schedule the Pos SRS transmissions for occasions outside of planned DMRS bundles. The second Pos SRS 912*b* is an example of a Pos SRS transmission that is outside of a DMRS bundle. Scheduling the Pos SRS within the holes of the PUSCH and/or outside of the DMRS bundle may enable the UE 105 to transmit Pos SRS at an intended transmit power to improve the quality of the resulting position estimate. In an example, the gNB 110*a* and the LMF 120 may be configured to increase the duration of the positioning timeout value 902 to accommodate the identification and implementation of PUSCH holes and/or periods that are outside of the DMRS bundle and enable the Pos SRS to be transmitted at the expected power level.

In an example, a UE may be configured to determine the transmit power requirements for the Pos SRS transmission (e.g., based on assistance data, channel response, etc.) and the PUSCHs in the DMRS bundle. If the transmit power requirements for both transmissions are within a threshold value of one another (e.g., +/−3 dB), then the UE may be configured to transmit the DMRS bundle and the Pos SRS as scheduled (e.g., the Pos SRS may be within an OFDM slot with the PUSCH). If the transmit power requirements exceed the threshold value, then the UE may be configured to trigger the suspend and/or fragment procedures as described herein. For example, the UE may be configured to transmit a UAI (UE assistance information) message to the gNB to suspend DMRS bundling.

In an example, the UE may be configured to determine if the transmit power(s) of PUSCH and/or the Pos SRS are associated with uncertainty values such that transmit power may be within a range based on the respective uncertainty values. For example, a PUSCH may have a transmit power of 15 dBm with a 3 dBm uncertainty value, and the Pos SRS may have a transmit power of 20 dBm with a 2 dBm uncertainty value. The UE may determine a common transmit power value which will satisfy the conditions for both the PUSCH and the Pos SRS. In this example, a transmit power of 18 dBm may be utilized for both the DMRS bundle and the Pos SRS. The common transmit power will enable maintenance of phase continuity requirements in the DMRS bundle. If a common transmit power cannot be established, then the UE may be configured to send a UAI message to trigger the suspension or fragmenting of the DMRS bundle.

In an example, a network entity such as the LMF and the gNB may be configured to compare the transmit power requirements and uncertainty values to determine if they are within a threshold value and/or determine a common transmit power, and provide transmit power information to the UE. For example, the LMF or the gNB may be configured to compute a common transmit power value and provide the common transmit power value to the UE.

Figure 11:
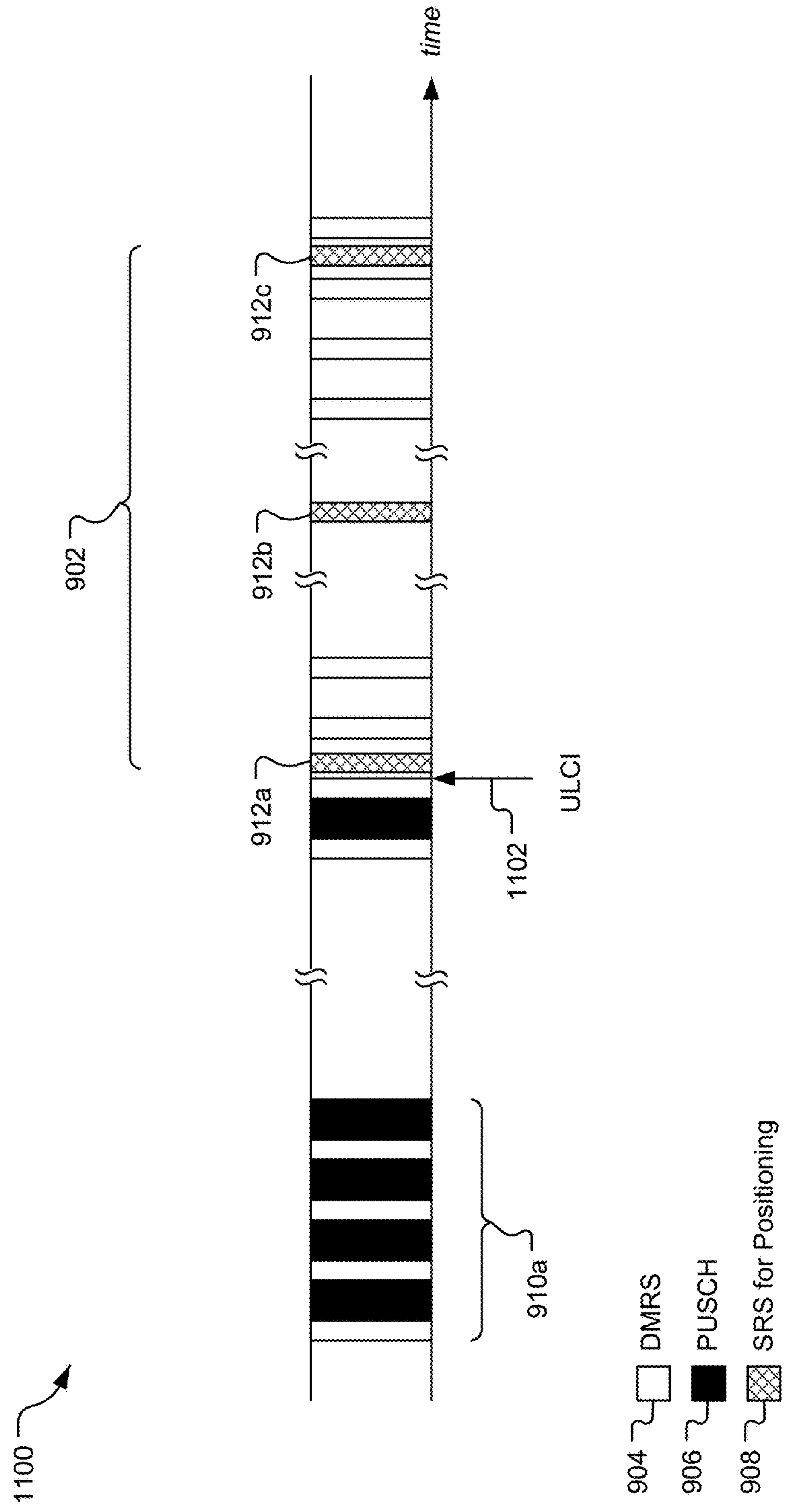
FIG. 11 is an example slot diagram including resources for DMRS bundling and Pos SRS, and an uplink cancelation indication (ULCI).

Referring to FIG. 11, with further reference to FIG. 9, an example slot diagram 1100 including resources for DMRS bundling and Pos SRS, and an uplink cancelation indication (ULCI) is shown. In an example, a serving station (e.g., the gNB 110*a*) may configure the UE 105 for DMRS bundling with PUSCH repetitions. A location server (e.g., the LMF 120), may initiate signaling with the gNB 110*a* for a positioning session to configure the Pos SRS. In response, the gNB 110*a* may configure the UE for ULCI DCI monitoring such that the gNB 110*a* may cancel the remaining PUSCH after the Pos SRS schedule negotiated with the LMF 120. For example, the gNB 110*a* may be configured to transmit a ULCI indication 1102 via DCI to cancel the PUSCH resources 906 within the positioning timeout value 902. The gNB 110*a* may be configured to determine the status of signals in the DMRS bundles and potentially cancel the remaining PUSCH in the bundle. For example, the gNB 110*a* may be configured to determine how far the UE 105 is in a current ongoing DMRS bundle relative to the positioning timeout value 902 for the positioning session. The gNB 110*a* may be configured to setup the ULCI indication 1102 for cancelling the remaining PUSCH in one or more bundles if the UE is already done transmitting most PUSCH in that bundle. In another example, the gNB 110*a* may be configured to setup the ULCI indication 1102 for cancelling the remaining PUSCH in one or more bundles if the positioning timeout value 902 is stringent to not allow deferring the session until the current ongoing DMRS bundle(s) are fully transmitted. The ULCI indication 1102 may enable the UE 105 to gracefully terminate the DMRS bundle(s) and the transmitted PUSCH within the bundle(s) may maintain the phase continuity. The maintenance of phase continuity may enhance chances to pass a cyclic redundancy check (CRC) compared to asynchronously disturbing phase discontinuity in the DMRS bundle.

In an example, the gNB 110*a* may configure Pos SRS resources through a combination of RRC based periodic resources and DCI based aperiodic resources. A collision of the periodic Pos SRS schedule may be managed by suspending such Pos SRS resources and compensating for those by DCI based SRS scheduling.

Referring to FIGS. 12A-12D, example message flow diagrams for configuring uplink based positioning with DMRS bundling are shown. The message flow diagrams include entities in the communication system 100, such as a UE 1202, a gNB 1204 and a LMF 1206. The UE 1202 may include some or all of the components of the UE 200, and the UE 200 is an example of the UE 1202. The gNB 1204 may include some or all of the components of the TRP 300, and the TRP 300 is an example of the gNB 1204. The LMF 1206 may include some or all of the components of the server 400, and the server 400 is an example of the LMF 1206. The message flows in FIGS. 12A-12D may utilize combinations of over-the-air (OTA) and backhaul signaling as known in the art. For example, RRC, DCI and MAC-CE techniques may be used between the gNB 1204 and the UE 1202. The message flows may utilize other protocols such as NAS (e.g., LPP/NPP) and NRPPa as described in FIG. 1. Other signaling techniques may also be used.

Figure 12A:
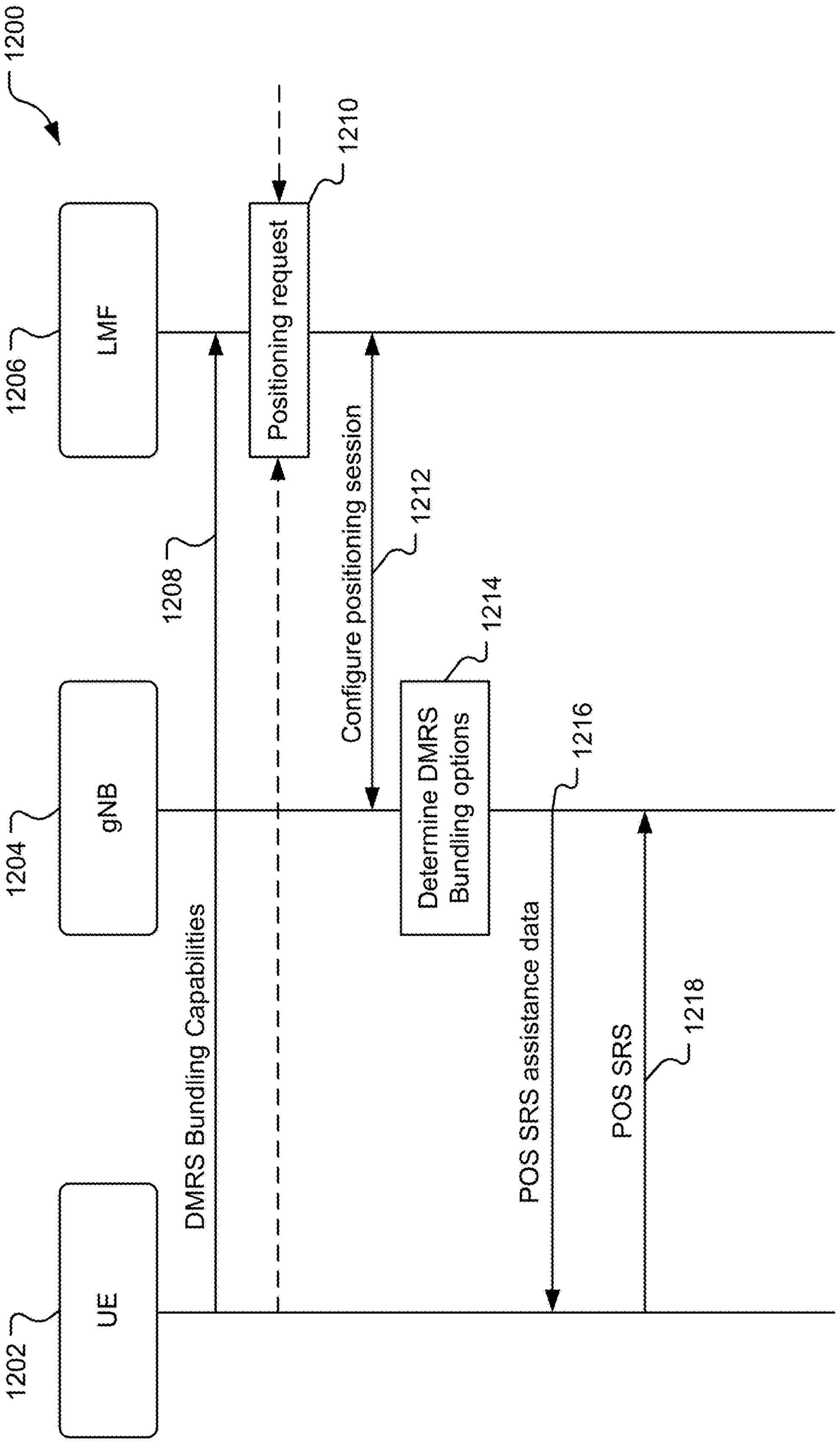
FIGS. 12A-12D are example message flow diagrams for configuring uplink based positioning with DMRS bundling.

In a first example message flow 1200, referring to FIG. 12A, the UE 1202 may be configured to provide an indication of DMRS bundling capabilities 1208 to the network. For example, a capabilities message may include one or more IEs to indicate that the UE 1202 is configured to support DMRS bundling. At stage 1210, the LMF 1206 may generate or receive a positioning request. The LMF 1206 may receive a positioning request from a network entity, such as the UE 1202, the gNB 1204, or other networked resource (e.g., external client 130). The LIMF 1206 may be configured to exchange configuration messages 1212 to negotiate with the gNB 1204 (or other gNBs) over NRPPa to suspend DMRS bundling by specifying a time over which uplink positioning signal measurements are to be obtained. For example, the time may be the positioning timeout value 902. At stage 1214, the gNB 1204 may be configured to fragment the configured DMRS bundles (e.g., FIG. 9) or suspend the DMRS bundles (e.g., FIG. 10). In an example, the gNB 1204 may be configured to determine a common transmit power value for the UE 1202 to transmit the DMRS bundles and Pos SRS. The gNB 1204 may be configured to transmit Pos SRS assistance data message 1216 based on the options determined at stage 1214. The Pos SRS assistance data message 1216 may utilize RRC or other signaling techniques, and may include DMRS bundling and Pos SRS configuration information. The UE 1202 may be configured to transmit one or more Pos SRS 1218 based at least in part on the Pos SRS assistance data message 1216.

Figure 12B:
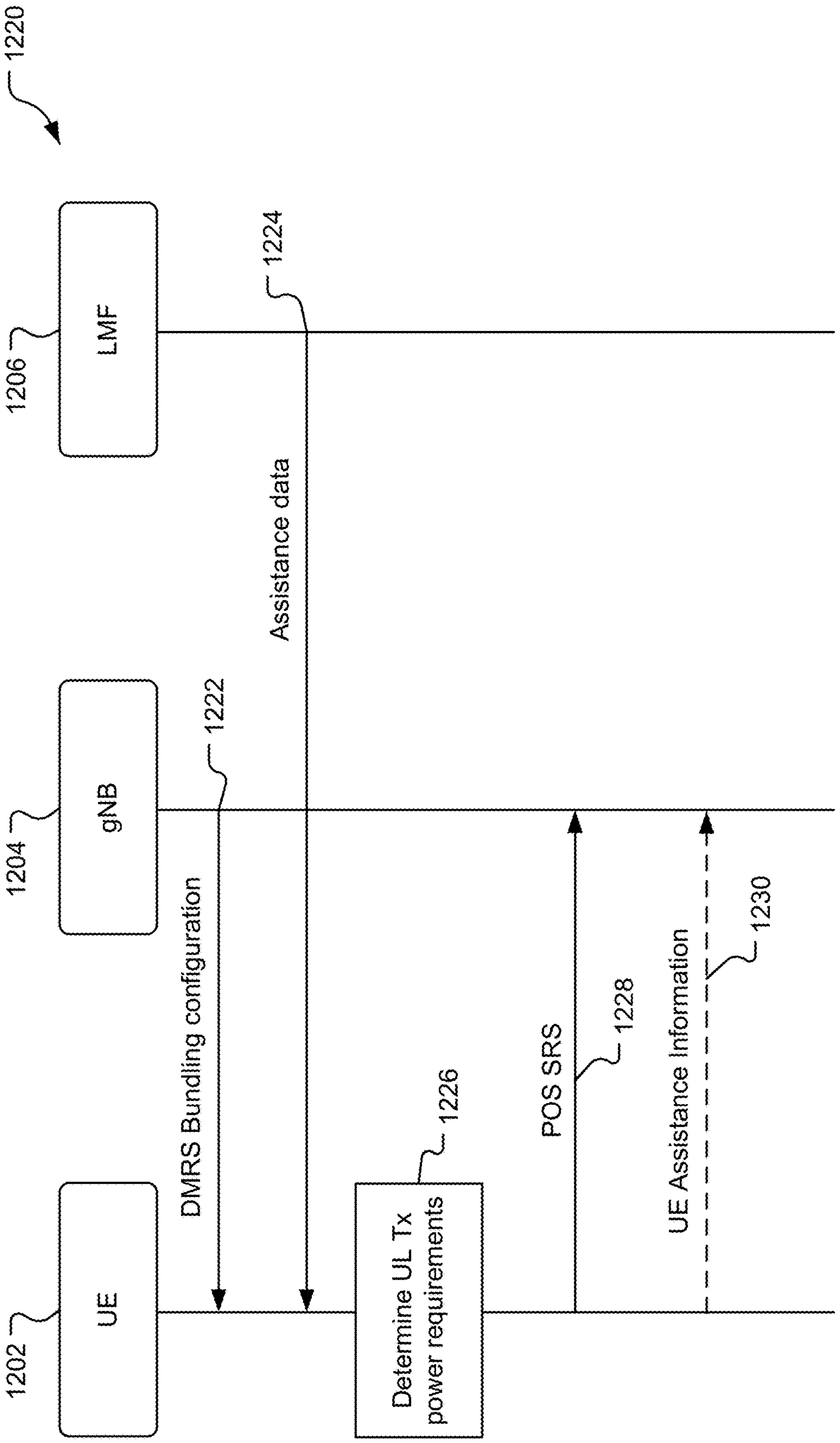

In a second example message flow 1220, referring to FIG. 12B, the UE 1202 may receive one or more DMRS bundling configuration messages 1222 from a serving station, such as the gNB 1204. The UE 1202 may be configured to utilize DMRS bundling based on the DMRS bundling configuration messages 1222. The UE 1202 may subsequently receive assistance data messages 1224 from the LIMF 1206 or the gNB 1204 associated with a positioning session. The assistance data messages 1224 may include the configuration information for one or more Pos SRS and one or more positioning sessions (e.g., positioning timeout values). At stage 1226, the UE may be configured to determine the uplink transmit power requirements based at least in part on the DMRS bundling configuration messages 1222 and the assistance data messages 1224. For example, the PUSCH and Pos SRS transmit power requirements may be within a threshold value of one another and may be transmitted based on the requested power values. The UE 1202 may be configured to determine a common transmit power value for both PUSCH and the Pos SRS based on the configuration information. The UE 1202 may transmit one or more Pos SRS 1228 (and the DMRS bundle) based on the power values determined at stage 1226. In an example, if the power requirements cannot be reconciled, the UE 1202 may be configured to transmit a UE assistance information message 1230 to request the gNB 1204 to suspend DMRS bundling during the positioning session.

Figure 12C:
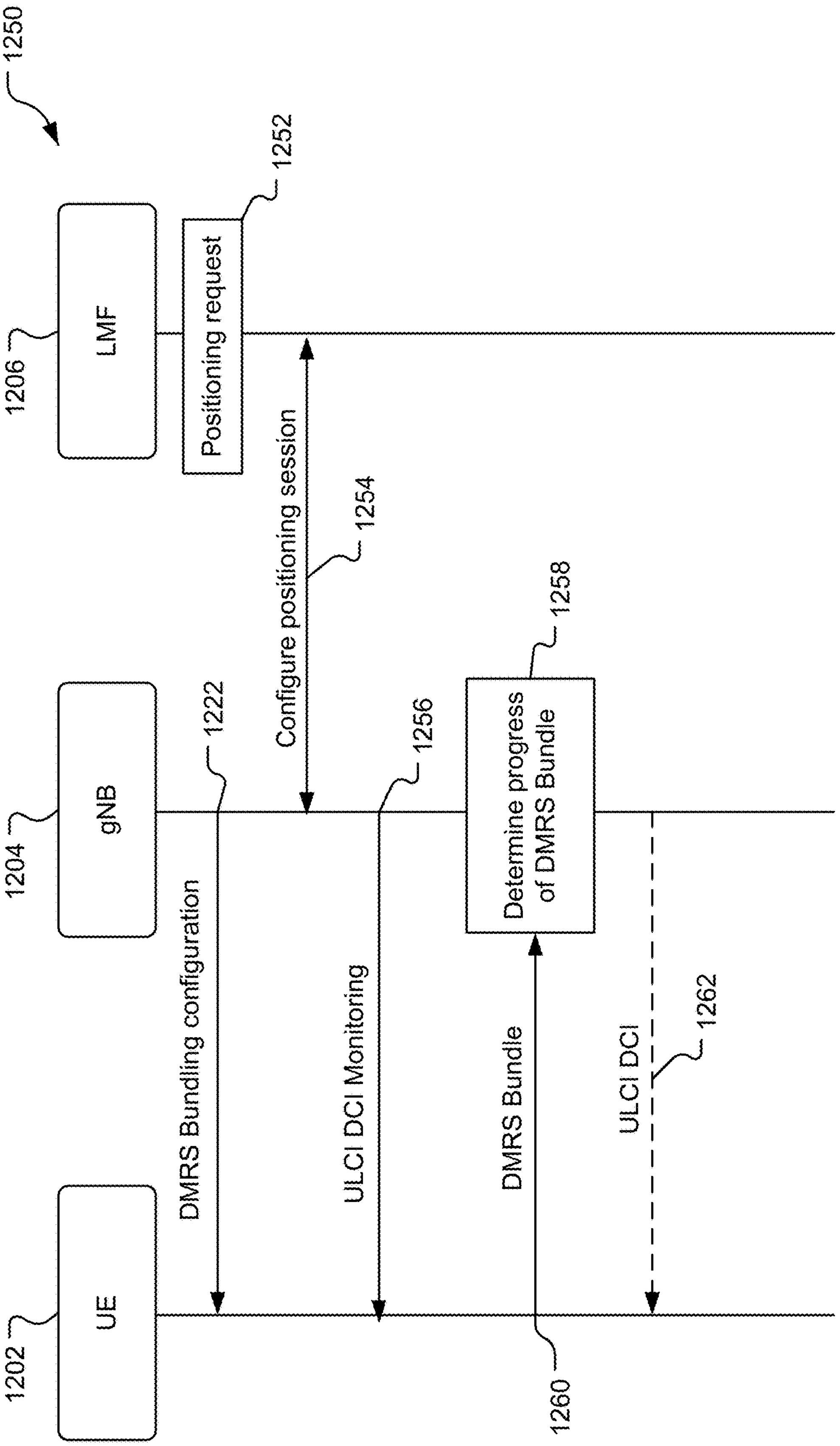

In a third example message flow 1250, referring to FIG. 12C, the gNB 1204 may configure DMRS bundling and provide one or more DMRS bundling configuration messages 1222 to the UE 1202. The UE 1202 may be configured to utilize DMRS bundling based on the DMRS bundling configuration messages 1222. The LMF 1206 may generate or receive a positioning request at stage 1252 and then negotiate with the gNB 1204 (or other gNBs) to configure one or more positioning sessions. For example, the gNB 1204 and the LMF 1206 may exchange one or more positioning session configuration messages 1254. The gNB 1204 may subsequently configure the UE 1202 for ULCI DCI monitoring at stage 1256. The ULCI DCI monitoring may enable the UE 1202 to cancel portions of one or more DMRS bundles. At stage 1258, the gNB 1204 may be configured to monitor DMRS bundles 1260 transmitted by the UE 1202 to determine progress on the completion of the PUSCH data. If the amount of data received in the PUSCH is above a threshold value (e.g., 70%, 80%, 90%, etc.), the gNB 1204 may be configured to transmit a ULCI DCI indication 1262 to suspend the transmission of remaining PUSCH slots in the bundle, and the UE may then transmit Pos SRS. The gNB 1204 may also send the ULCI DCI indication 1262 to cancel the PUSCH slots in one or more bundles if the positioning session timeout period is stringent.

Figure 12D:
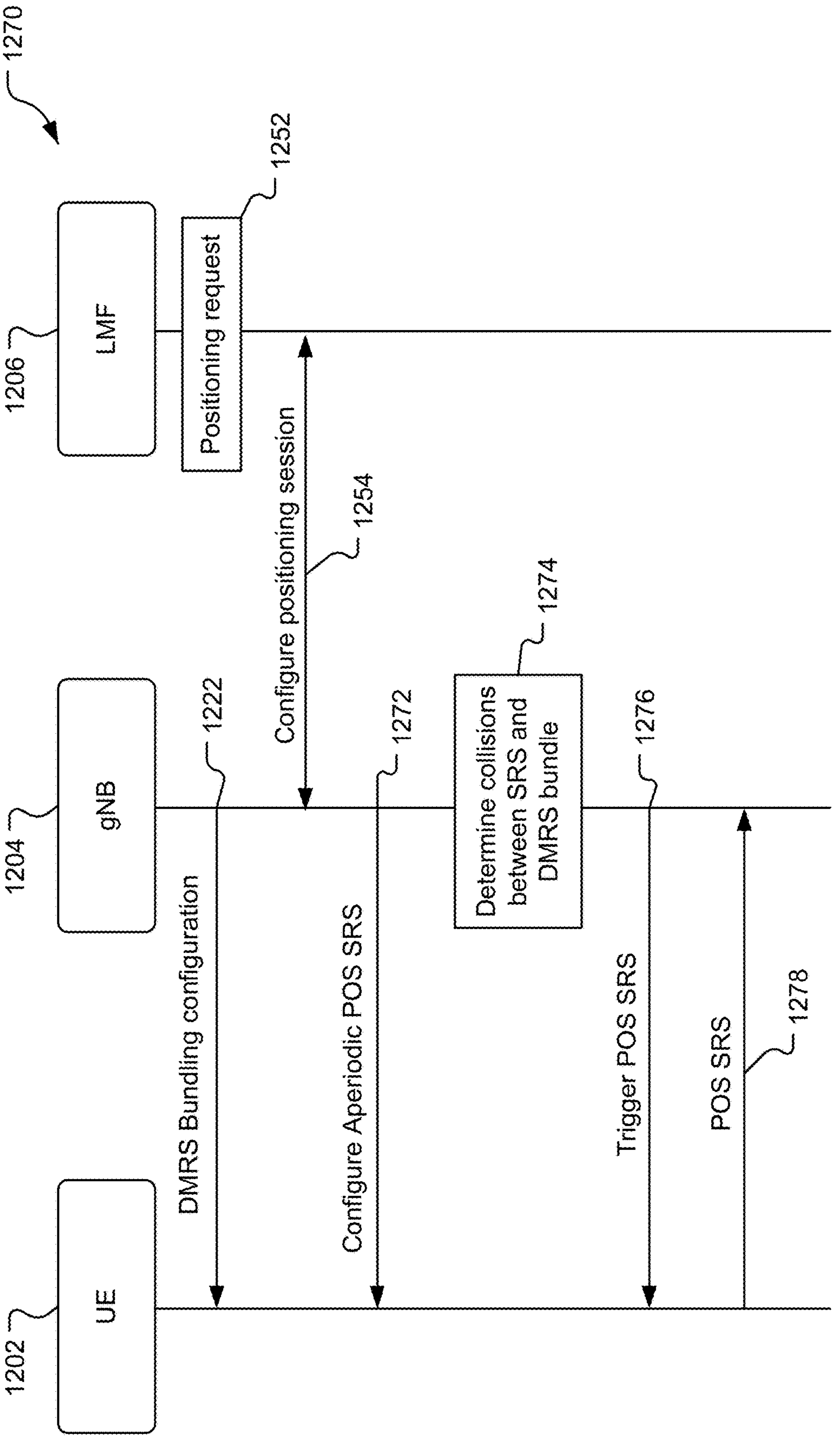

In a fourth example message flow 1270, referring to FIG. 12D, the gNB 1204 may configure DMRS bundling and provide one or more DMRS bundling configuration messages 1222 to the UE 1202, and the LMF 1206 may generate or receive a positioning request at stage 1252 and then exchange one or more positioning session configuration messages 1254 with the gNB 1204 to configure one or more positioning sessions. The gNB 1204 may provide one or more aperiodic Pos SRS configuration messages 1272 to the UE 1202 to enable aperiodic Pos SRS transmissions. In an example, the aperiodic Pos SRS configuration messages 1272 may be provided in one or more SIBs or via other RRC messaging. At stage 1274, the gNB 1204 may be configured to determine potential collisions (e.g., based on timing information) between the DMRS bundles and the requested Pos SRS slots. To avoid such collisions, the gNB 1204 may trigger Pos SRS transmissions to avoid an overlap with the DMRS bundle. For example, the gNB 1204 may send one or more trigger indications 1276 to the UE 1202 to instruct the UE to transmit Pos SRS 1278 during null time gaps (e.g., slots which are not being used by the DMRS bundle). In an example, the trigger indications 1276 may utilize DCI or MAC-CE signaling techniques. Other signals may also be used to trigger the transmission of Pos SRS by the UE 1202.

Figure 13:
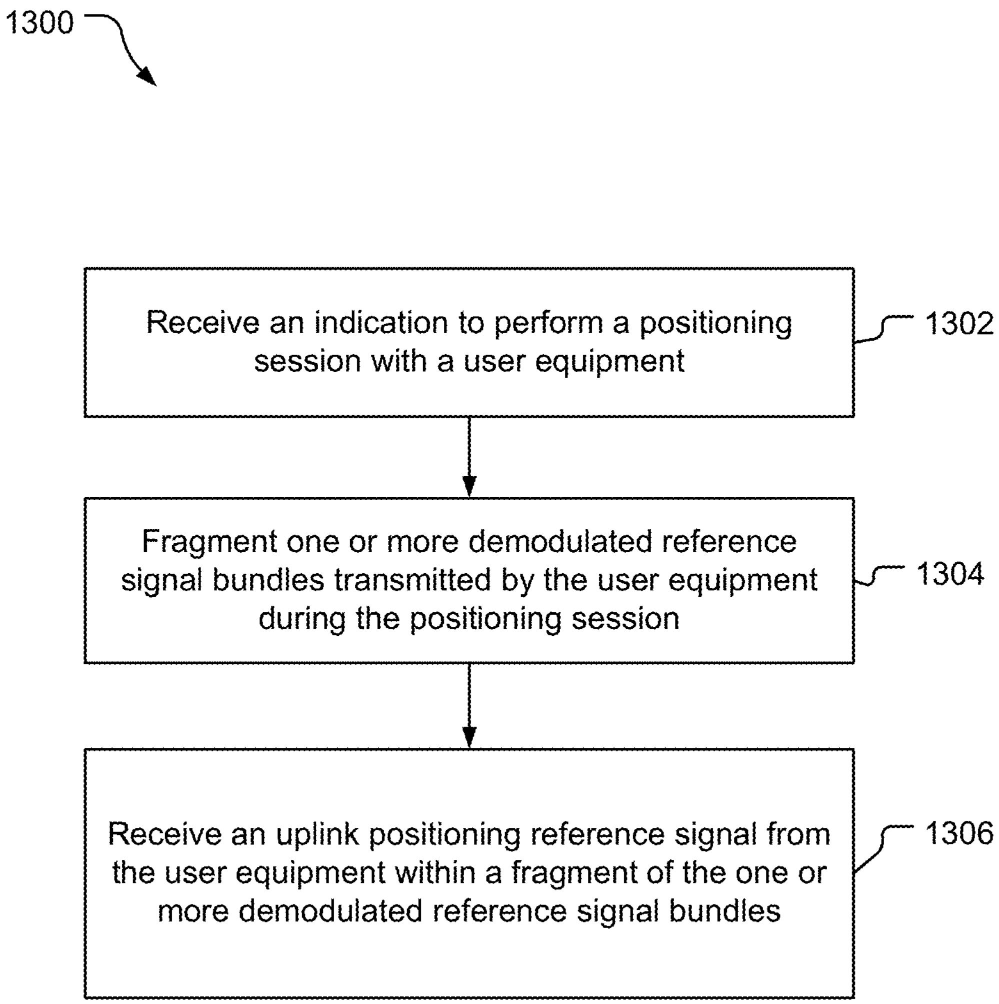
FIG. 13 is a process flow diagram of an example method for receiving uplink positioning reference signals.

Referring to FIG. 13, with further reference to FIGS. 1-12D, a method 1300 for receiving uplink positioning reference signals includes the stages shown. The method 1300 is, however, an example only and not limiting. The method 1300 may be altered, e.g., by having one or more stages added, removed, rearranged, combined, performed concurrently, and/or by having one or more single stages split into multiple stages.

At stage 1302, the method includes receiving an indication to perform a positioning session with a user equipment. A TRP 300, including a processor 310 and a transceiver 315, is a means for receiving the indication to perform a positioning session. In an example, referring to FIG. 12A, a TRP 300 such as the gNB 1204 may receive the indication to perform a positioning session from a network resource, such as the LMF 1206. The LMF 1206 and the gNB 1204 may exchange configuration messages 1212 over NRPPa to determine a time period when the user equipment will transmit uplink positioning signals (e.g., Pos SRS). For example, the positioning session may include timeout information (e.g., a positioning timeout value 902) indicating the time period in which the UE should transmit uplink positioning signals.

At stage 1304, the method includes fragmenting one or more demodulated reference signal bundles transmitted by the user equipment during the positioning session. The TRP 300, including the processor 310 and the transceiver 315, is a means for fragmenting the one or more DMRS bundles. Prior to receiving the positioning session indication at stage 1302, the gNB 1204 may provide DMRS bundling configuration information to the UE 1202 to enable the UE 1202 to transmit DMRS bundles while maintaining coherency. At stage 1214, the gNB 1204 may be configured to suspend a portion of the prior DMRS bundling configuration to create DMRS bundle fragments based on the timing information for the positioning session. For example, the gNB 1204 may transmit Pos SRS assistance data message 1216 including information elements to enable the UE 1202 to fragment the DMRS bundles and transmit Pos SRS within fragments in order to obtain the required measurements within the stipulated time.

At stage 1306, the method includes receiving an uplink positioning reference signal from the user equipment within a fragment of the one or more demodulated reference signal bundles. The TRP 300, including the processor 310 and the transceiver 315, is a means for receiving the UL positioning reference signal within the DMRS bundle fragments. In an example, referring to FIG. 9, the UE 1202 may transmit the first Pos SRS 912*a* within a fragment in the second DMRS bundle 910*b*, and the third Pos SRS 912*c* within a fragment in the third DMRS bundle 910*c*, and gNB 1204 may be configured to receive one or more of the transmitted Pos SRS.

Figure 14:
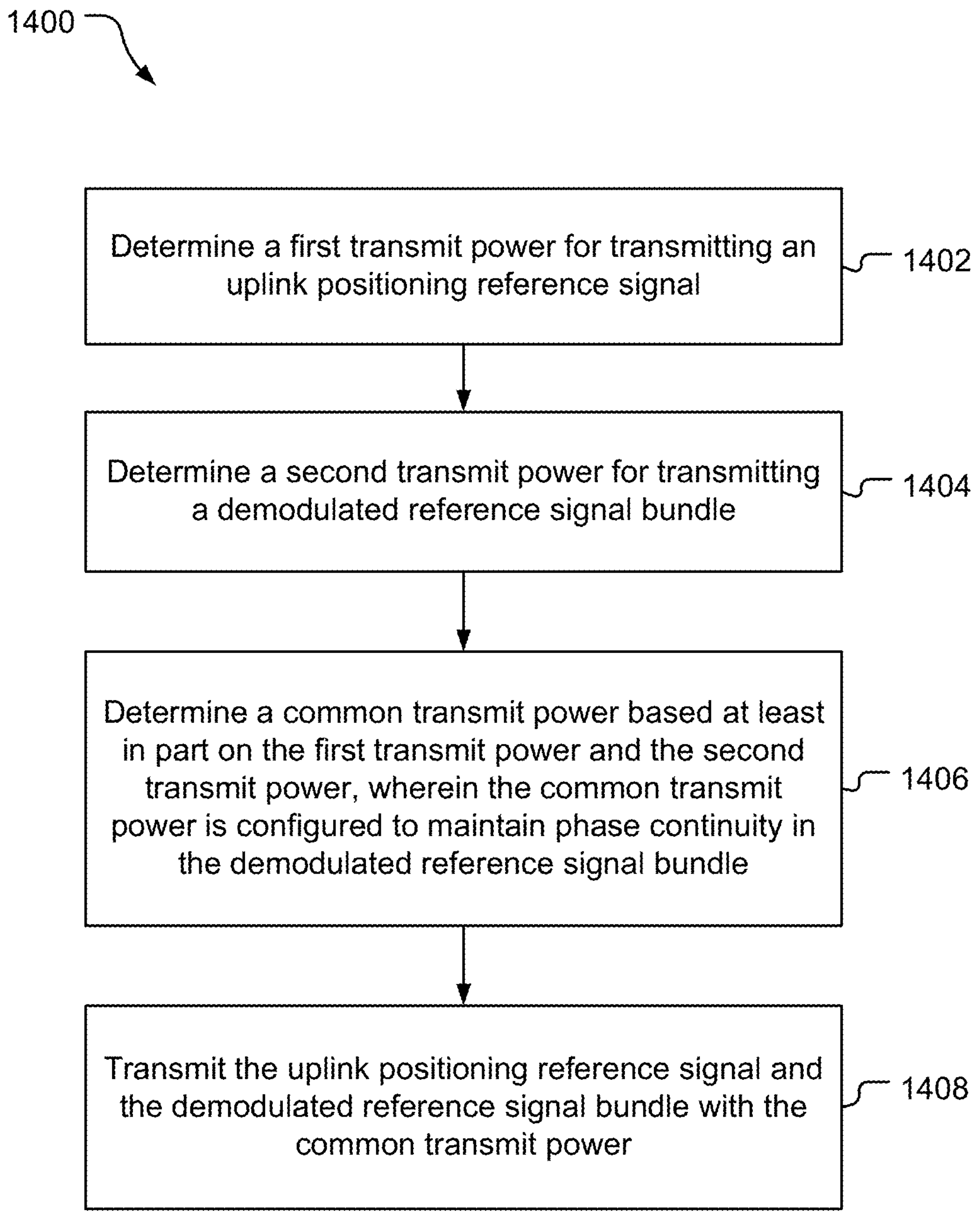
FIG. 14 is a process flow diagram of an example method for transmitting positioning reference signals and DMRS bundles.

Referring to FIG. 14, with further reference to FIGS. 1-12D, a method 1400 for transmitting positioning reference signals and DMRS bundles includes the stages shown. The method 1400 is, however, an example only and not limiting. The method 1400 may be altered, e.g., by having one or more stages added, removed, rearranged, combined, performed concurrently, and/or by having one or more single stages split into multiple stages.

At stage 1402, the method includes determining a first transmit power for transmitting an uplink positioning reference signal. A UE 200, including the processors 210 and the transceiver 215, is a means for determining the first transmit power. A mobile device, such as the UE 200, may receive positioning reference signal configuration information including timing and transmit power requirements. For example, the reference signal configuration information may be UL-SRS (i.e., Pos SRS) resource sets provided by a network resource. In an example, referring to FIG. 12B, the UE 1202 may receive assistance data messages 1224 from the LMF 1206 including uplink positioning reference signal configuration information with implicit indications of associated transmit powers for the uplink signals. In an example, the UE 1202 may be configured to determine the first transmit power based on channel information, such as the channel impulse response, path loss, and other channel estimation techniques. The UE 1202 may be configured with a data structure (e.g., look-up-table) or other functions to determine a transmit power based at least in part on the channel information. In an example, a serving BS (e.g., the gNB 1204) may be configured to provide transmit power information for uplink signals to a UE.

At stage 1404, the method includes determining a second transmit power for transmitting a demodulated reference signal bundle. The UE 200, including the processors 210 and the transceiver 215, is a means for determining the second transmit power. In an example, referring to FIG. 12B, a serving base station (e.g., the gNB 1204) may be configured to provide DMRS configuration information to the UE. The configuration information may include timing and transmit power information to enable the UE to coherently transmit DMRS bundles. The second transmit power may be the transmit power provided in the DMRS bundling configuration information. In an example, the UE 200 may be configured to determine the power for transmitting DMRS bundles based on channel state information (e.g., as measured by the UE or as provided by a network resource).

At stage 1406, the method includes determining a common transmit power based at least in part on the first transmit power and the second transmit power, wherein the common transmit power is configured to maintain phase continuity in the demodulated reference signal bundle. The UE 200, including the processors 210, is a means for determining common transmit power. The uplink positioning reference signal information and DMRS bundling configuration information received from one or more network resources may include uncertainty values associated with transmitting the respective signals. The uncertainty values may define an acceptable range of transmit powers that may be used to transmit the signals. For example, the common transmit power may be based on allowed uncertainties for transmitting PUSCH and Pos SRS. A PUSCH may have a transmit power of 15 dBm with a 3 dBm uncertainty value, and the Pos SRS may have a transmit power of 18 dBm with a 2 dBm uncertainty value. The UE may determine a common transmit power value which will satisfy the conditions for both the PUSCH and the Pos SRS. In this example, transmit powers of 16-18 dBm may be utilized for both the DMRS bundle and the Pos SRS. In an example, a serving base station (e.g., gNB 1204) may be configured to compute the common transmit power and provide it to the UE via messaging (e.g., RRC, DCI, MAC-CE).

At stage 1408, the method includes transmitting the uplink positioning reference signal and the demodulated reference signal bundle with the common transmit power. The UE 200, including the processors 210 and the transceiver 215, is a means for transmitting the UL positioning reference signal and the DMRS bundle with the common transmit power. The common transmit power will enable maintenance of phase continuity requirements in the DMRS bundle, and may enhance reference signal detection to improve positioning performance.

Figure 15:
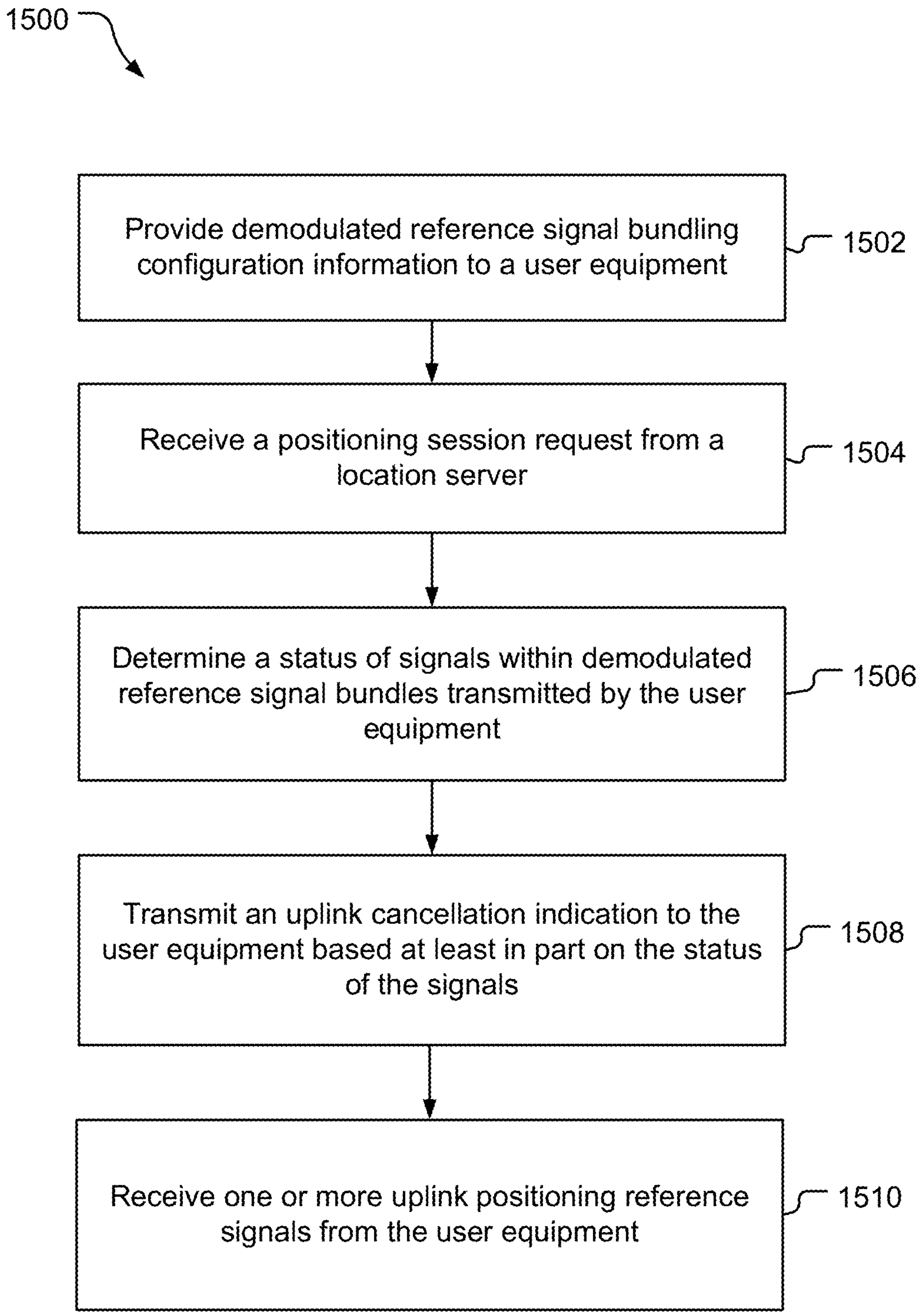
FIG. 15 is a process flow diagram of an example method for receiving uplink positioning reference signals.

Referring to FIG. 15, with further reference to FIGS. 1-12D, a method 1500 for receiving uplink positioning reference signals includes the stages shown. The method 1500 is, however, an example only and not limiting. The method 1500 may be altered, e.g., by having one or more stages added, removed, rearranged, combined, performed concurrently, and/or by having one or more single stages split into multiple stages.

At stage 1502, the method includes providing demodulated reference signal bundling configuration information to a user equipment. A TRP 300, including a processor 310 and a transceiver 315, is a means for providing the DMRS bundling configuration information. In an example, referring to FIG. 12C, the gNB 1204 may be configured to provide one or more DMRS bundling configuration messages 1222 to the UE 1202, and the UE 1202 may be configured to utilize DMRS bundling based on the DMRS bundling configuration messages 1222. The DMRS bundling configuration messages 1222, or other messages provided to the UE 1202, may include information elements to configure the UE 1202 for ULCI DCI monitoring.

At stage 1504, the method includes receiving a positioning session request from a location server. The TRP 300, including the processor 310 and the transceiver 315, is a means for receiving the positioning session request. In an example, referring to FIG. 12C, the location server (e.g., LMF 1206) may negotiate with the gNB 1204 to configure a positioning session. For example, the gNB 1204 and the LMF 1206 may exchange one or more positioning session configuration messages 1254. A timeout value may be associated with the positioning session to indicate a time period in which uplink positioning reference signals are to be transmitted by the user equipment.

At stage 1506, the method includes determining a status of signals within demodulated reference signal bundles transmitted by the user equipment. The TRP 300, including the processor 310 and the transceiver 315, is a means for determining the status of signals within DMRS bundles. The gNB 1204 may be configured to monitor DMRS bundles 1260 transmitted by the UE 1202 to determine progress on the completion of the PUSCH data. The status of the signals may be an amount of the PUSCH data received in view of the timeout value for the positioning session. For example, gNB 1204 may be configured to determine a number of PUSCH slots which will be received outside of the timeout value as compared to a number of PUSCH slots which will be received within the timeout value.

At stage 1508, the method includes transmitting an uplink cancellation indication to the user equipment based at least in part on the status of the signals. The TRP 300, including the processor 310 and the transceiver 315, is a means for transmitting a ULCI indication. In an example, the TRP 300 may be configured to determine if the amount of data received in the PUSCH is above a threshold value (e.g., 70%, 80%, 90%, etc.). The threshold value may be based on a ratio of the number of PUSCH slots received outside of the timeout value as compared to a number of PUSCH slots remaining within the timeout value. The TRP 300 may be configured to transmit the ULCI DCI indication to suspend the transmission of remaining PUSCH slots in the bundle if the amount of data received in the PUSCH is above the threshold value. In an example, the TRP 300 may be configured to send the ULCI DCI indication 1262 to cancel the PUSCH slots in one or more bundles if the positioning session timeout period is stringent (i.e., cannot be modified). That is, the TRP 300 may not delay the timeout period until the current DMRS bundle is fully transmitted.

At stage 1510, the method includes receiving one or more uplink positioning reference signals from the user equipment. The TRP 300, including the processor 310 and the transceiver 315, is a means for receiving the one or more UL positioning reference signals. The UE may be configured to transmit UL-PRS (e.g., Pos SRS) based on the timeout value, and the TRP 300 may be configured to receive one or more of the UL signals to satisfy the requirements of the positioning session.

Figure 16:
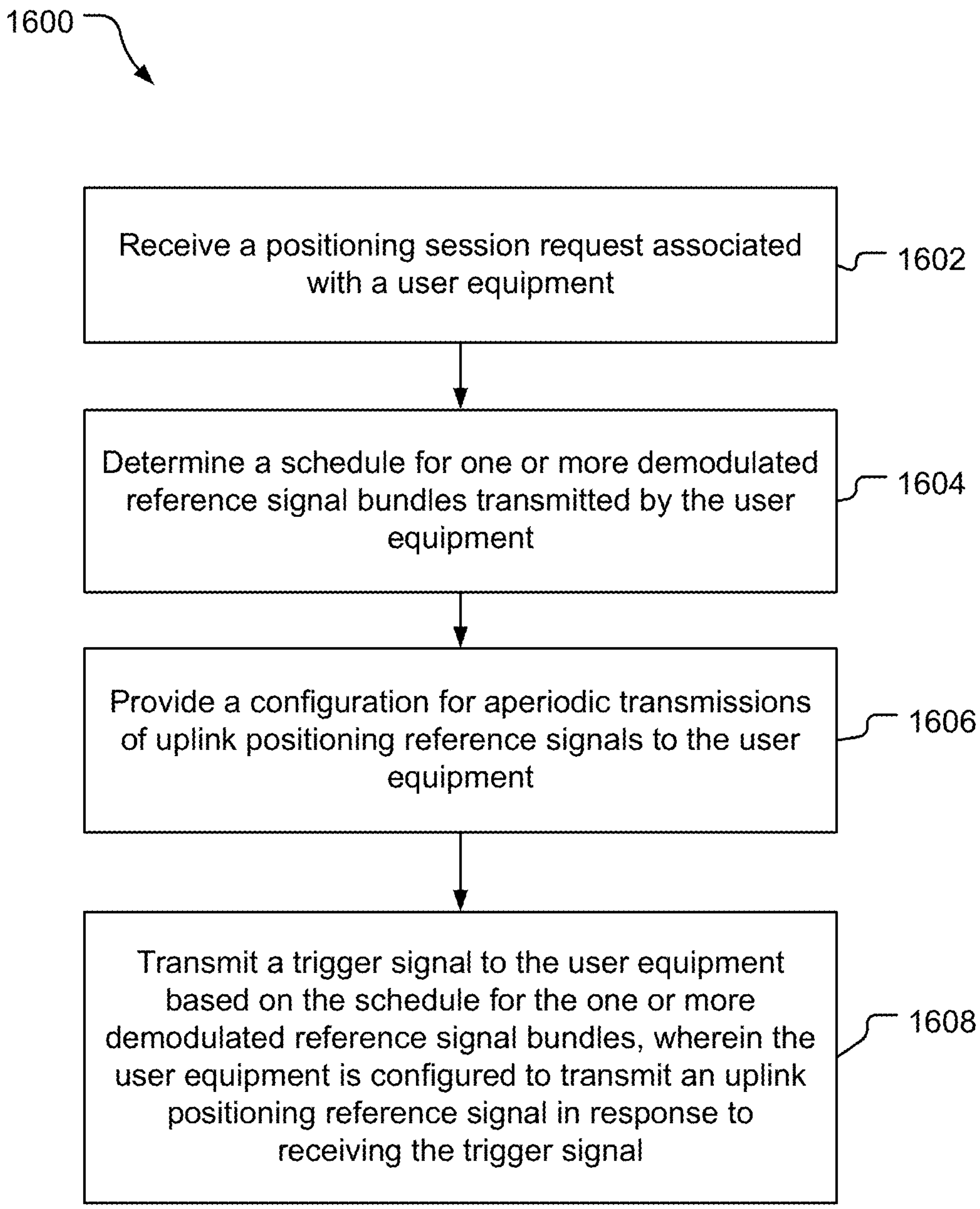
FIG. 16 is a process flow diagram of an example method for configuring aperiodic uplink positioning reference signals.

Referring to FIG. 16, with further reference to FIGS. 1-12D, a method 1600 for configuring aperiodic uplink positioning reference signals includes the stages shown. The method 1600 is, however, an example only and not limiting. The method 1600 may be altered, e.g., by having one or more stages added, removed, rearranged, combined, performed concurrently, and/or by having one or more single stages split into multiple stages.

At stage 1602, the method includes receiving a positioning session request associated with a user equipment. A TRP 300, including a processor 310 and a transceiver 315, is a means for receiving the positioning session request. In an example, referring to FIG. 12D, the gNB 1204 may receive the positioning session request from a network resource, such as the LMF 1206. The LMF 1206 and the gNB 1204 may exchange configuration messages 1212 over NRPPa to determine a time period when the user equipment will transmit uplink positioning signals (e.g., Pos SRS). For example, the positioning session may include timeout information (e.g., a positioning timeout value 902) indicating the time period in which the UE should transmit uplink positioning signals.

At stage 1604, the method includes determining a schedule for one or more demodulated reference signal bundles transmitted by the user equipment. The TRP 300, including the processor 310 and the transceiver 315, is a means for determining a schedule for one or more DMRS bundles. In an example, the gNB 1204 may configure DMRS bundling and provide one or more DMRS bundling configuration messages 1222 to the UE 1202, and the UE 1202 may be configured to utilize DMRS bundling based on the DMRS bundling configuration messages 1222. The gNB may be configured to determine when the time domain gaps in the DMRS bundles will occur and identify the gaps occurring within the positioning timeout value 902.

At stage 1606, the method includes providing a configuration for aperiodic transmissions of uplink positioning reference signals to the user equipment. The TRP 300, including the processor 310 and the transceiver 315, is a means for providing a configuration for aperiodic transmissions to the UE. In an example, referring to FIG. 12D, the gNB 1204 may provide one or more aperiodic Pos SRS configuration messages 1272 to the UE 1202 to enable aperiodic Pos SRS transmissions. The aperiodic Pos SRS configuration messages 1272 may be provided in OTA messaging techniques such as RRC (e.g., the configuration information may be included in one or more SIBs). Other signaling techniques may also be used.

At stage 1608, the method includes transmitting a trigger signal to the user equipment based on the schedule for the one or more demodulated reference signal bundles, wherein the user equipment is configured to transmit an uplink positioning reference signal in response to receiving the trigger signal. The TRP 300, including the processor 310 and the transceiver 315, is a means for transmitting the trigger signal. In operation, the TRP 300 may be configured to determine potential collisions (e.g., based on timing information) between the DMRS bundles and uplink positioning reference signals required for the positioning session request received at stage 1602. The TRP 300 may be configured to trigger the transmission of uplink positioning reference signal (e.g., Pos SRS) to avoid an overlap with the one or more DMRS bundles. For example, referring to FIG. 12D, the gNB 1204 may send one or more trigger indications 1276 to the UE 1202 to instruct the UE to transmit Pos SRS 1278 during available time gaps that are not being used for the DMRS bundle transmissions (i.e., null time gaps). In an example, the trigger signals may be transmitted based on DCI or MAC-CE signaling techniques. Other signals may also be used to trigger the transmission of uplink positioning reference signals by the UE.

Figure 17:
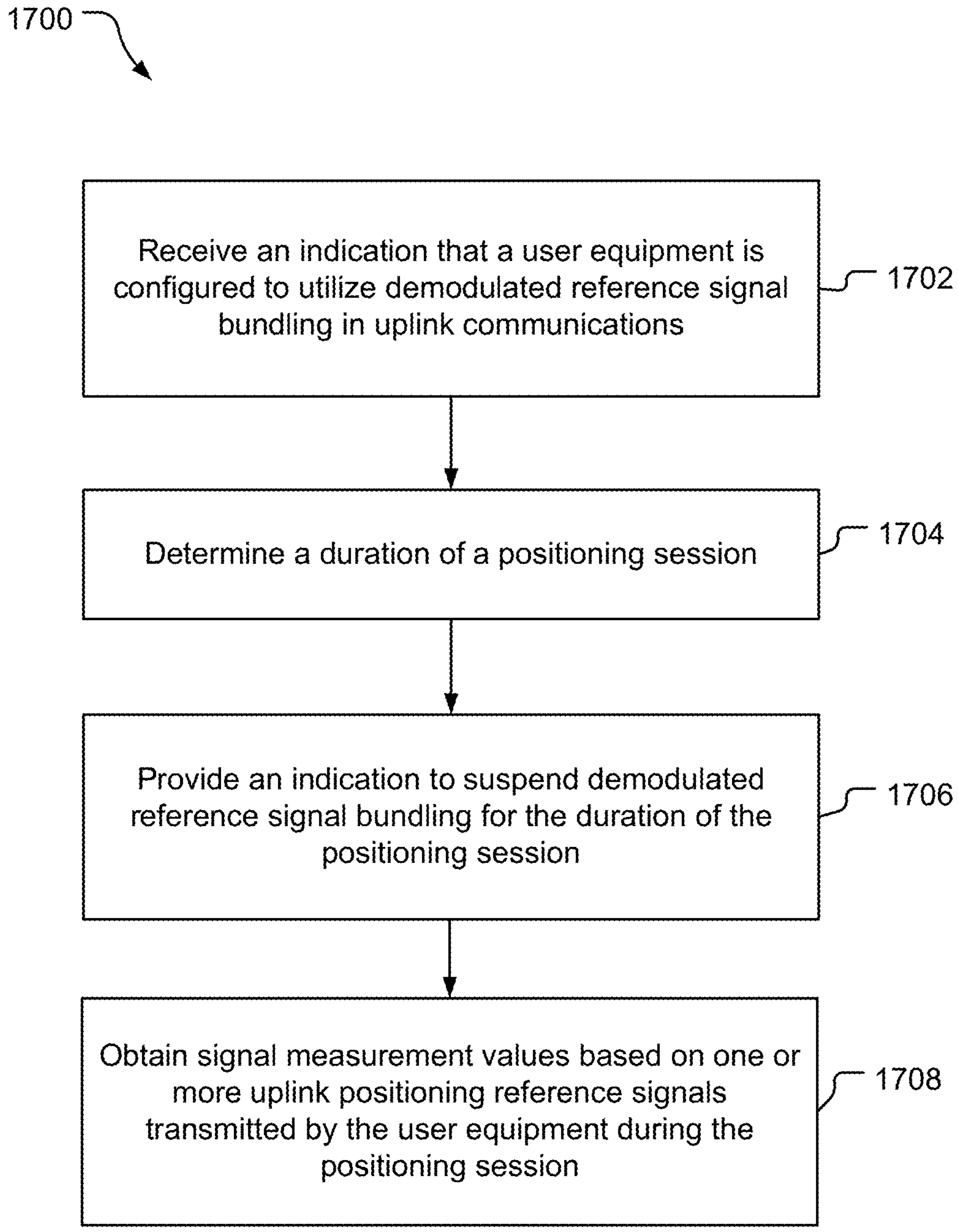
FIG. 17 is a process flow diagram of an example method for obtaining uplink positioning reference signal measurements.

Referring to FIG. 17, with further reference to FIGS. 1-12D, a method 1700 for obtaining uplink positioning reference signal measurements includes the stages shown. The method 1700 is, however, an example only and not limiting. The method 1700 may be altered, e.g., by having one or more stages added, removed, rearranged, combined, performed concurrently, and/or by having one or more single stages split into multiple stages. The method 1700 may be performed by an entity in the communication system 100, such as the LMF 120 or the gNB 110*a*.

At stage 1702, the method includes receiving an indication that a user equipment is configured to utilize demodulated reference signal bundling in uplink communications. A server 400 such as the LMF 120, including a processor 410 and a transceiver 415, is a means for receiving an indication that the UE is configured to utilize DMRS bundling. In an example, referring to FIG. 12A, the UE 1202 may be configured to provide an indication of DMRS bundling capabilities 1208 to one or more network resources such as the gNB 1204 and the LMF 1206. For example, a capabilities message, which may include one or more IEs to indicate that the UE 1202 is configured to support DMRS bundling, may be received by the LMF 1206.

At stage 1704, the method includes determining a duration of a positioning session. The server 400, including the processor 410 and the transceiver 415, is a means for determining the duration of a positioning session. In an example, the server 400 may generate or receive a positioning request. A LMF may receive a positioning request from a network entity, such as a UE, a base station (e.g., gNB), or other networked resource (e.g., external client 130). The LMF may configure the positioning session and provide configuration information to network stations over NRPPa or other signaling methods. The configuration information may include timing information including an indication of the duration of the positioning session (e.g., a positioning timeout value 902).

At stage 1706, the method includes providing an indication to suspend demodulated reference signal bundling for the duration of the positioning session. The server 400, including the processor 410 and the transceiver 415, is a means for providing the indication to suspend the DMRS bundle. In an example, referring to FIG. 10, the LMF 120 may be configured to negotiate with the gNB 110*a* over NRPPa to suspend the DMRS bundling by specifying the time over which uplink positioning measurements are to be collected (e.g., as a function of the positioning timeout value 902). The slot diagram 1000 includes examples of suspended DMRS bundling. A suspended DMRS bundle may enable the UE to transmit uplink positioning reference signals within the positioning session at a requested beam configuration (e.g., at a higher transmit power as compared to the DMRS bundles). The method 1700 may be implemented for use cases when a high quality position estimate takes precedence over the potential uplink latency increase due to the suspension of DMRS bundles.

At stage 1708, the method includes obtaining signal measurement values based on one or more uplink positioning reference signals transmitted by the user equipment during the positioning session. The server 400, including the processor 410 and the transceiver 415, is a means for obtaining the signal measurement values. The UE may transmit uplink positioning reference signals such as Pos SRS to one or more base stations (e.g., gNBs) in a communication network. The gNBs may obtain measurement values such as ToA, AoA, RSRP, RSPQ, or combinations of measurements based on the received uplink signals. In an example, the gNBs may provide the measurement values to a network resource, such as the LMF 120. The LMF 120 may obtain the measurement values from one or more base stations, and the LMF 120 may be configured to generate a position estimate for the UE based on the measurement values. The LMF 120 may be configured to provide the measurement values to other network entities (e.g., UEs, gNBs, servers), and the network entities may be configured to compute a position estimate for the UE.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are provided in the following numbered clauses.

Clause 1. A method for obtaining uplink positioning reference signal measurements, comprising: receiving an indication that a user equipment is configured to utilize demodulated reference signal bundling in uplink communications; determining a duration of a positioning session; providing an indication to suspend demodulated reference signal bundling for the duration of the positioning session; and obtaining signal measurement values based on one or more uplink positioning reference signals transmitted by the user equipment during the positioning session.

Clause 2. The method of clause 1 wherein the one or more uplink positioning reference signals include one or more sounding reference signals for positioning.

Clause 3. The method of clause 1 wherein the indication that the user equipment is configured to utilize demodulated reference signal bundling is received from the user equipment.

Clause 4. The method of clause 1 wherein the indication that the user equipment is configured to utilize demodulated reference signal bundling is received from a location management function.

Clause 5. The method of clause 1 wherein the indication to suspend demodulated reference signal bundling includes an indication to suspend transmitting on a physical uplink shared channel for the duration of the positioning session.

Clause 6. A method for receiving uplink positioning reference signals, comprising: receiving an indication to perform a positioning session with a user equipment; fragmenting one or more demodulated reference signal bundles transmitted by the user equipment during the positioning session; and receiving an uplink positioning reference signal from the user equipment within a fragment of the one or more demodulated reference signal bundles.

Clause 7. The method of clause 6 wherein the uplink positioning reference signal is a sounding reference signal for positioning.

Clause 8. The method of clause 6 wherein fragmenting a demodulated reference signal bundle includes suspending one or more transmissions on a physical uplink shared channel within a duration of the positioning session.

Clause 9. The method of clause 8 wherein the uplink positioning reference signal is received during a time period of a suspended transmission on the physical uplink shared channel.

Clause 10. The method of clause 6 wherein the indication to perform the positioning session is received from a location management function.

Clause 11. The method of clause 6 wherein fragmenting the one or more demodulated reference signal bundles includes suspending at least one demodulated reference signal bundle.

Clause 12. A method for transmitting positioning reference signals and demodulated reference signal bundles, comprising: determining a first transmit power for transmitting an uplink positioning reference signal; determining a second transmit power for transmitting a demodulated reference signal bundle; determining a common transmit power based at least in part on the first transmit power and the second transmit power, wherein the common transmit power is configured to maintain phase continuity in the demodulated reference signal bundle; and transmitting the uplink positioning reference signal and the demodulated reference signal bundle with the common transmit power.

Clause 13. The method of clause 12 wherein the uplink positioning reference signal is a sounding reference signal for positioning.

Clause 14. The method of clause 12 wherein determining the first transmit power includes receiving uplink reference signal configuration information including an indication of the first transmit power.

Clause 15. The method of clause 14 wherein the uplink reference signal configuration information is received from a location management function.

Clause 16. The method of clause 14 wherein the indication of the first transmit power includes an uncertainty value associated with the first transmit power.

Clause 17. The method of clause 12 wherein determining the second transmit power includes receiving demodulated reference signal bundle configuration information including an indication of the second transmit power.

Clause 18. The method of clause 17 wherein the demodulated reference signal bundle configuration information is received from a base station.

Clause 19. The method of clause 17 wherein the indication of the second transmit power include an uncertainty value associated with the second transmit power.

Clause 20. The method of clause 12 wherein the first transmit power and the second transmit power are equal to the common transmit power.

Clause 21. A method for receiving uplink positioning reference signals, comprising: providing demodulated reference signal bundling configuration information to a user equipment; receiving a positioning session request from a location server; determining a status of signals within demodulated reference signal bundles transmitted by the user equipment; transmitting an uplink cancellation indication to the user equipment based at least in part on the status of the signals; and receiving one or more uplink positioning reference signals from the user equipment.

Clause 22. The method of clause 21 wherein the one or more uplink positioning reference signals includes a sounding reference signal for positioning.

Clause 23. The method of clause 21 further comprising configuring the user equipment for uplink cancellation indication downlink control information (ULCI DCI) monitoring.

Clause 24. The method of clause 21 wherein determining the status of signals within the demodulated reference signal bundles includes determining a number of uplink slots in the demodulated reference signal bundles that are within a time period indicated in the positioning session request.

Clause 25. The method of clause 24 wherein transmitting the uplink cancellation indication is based at least in part on the number of uplink slots in the demodulated reference signal bundles that are within the time period.

Clause 26. The method of clause 21 wherein the positioning session request includes an indication of a stringent time period, and transmitting the uplink cancellation indication is based at least in part on the indication of the stringent time period.

Clause 27. A method for configuring aperiodic uplink positioning reference signals, comprising: receiving a positioning session request associated with a user equipment; determining a schedule for one or more demodulated reference signal bundles transmitted by the user equipment; providing a configuration for aperiodic transmissions of uplink positioning reference signals to the user equipment; and transmitting a trigger signal to the user equipment based on the schedule for the one or more demodulated reference signal bundles, wherein the user equipment is configured to transmit an uplink positioning reference signal in response to receiving the trigger signal.

Clause 28. The method of clause 27 wherein the configuration for aperiodic transmission or uplink positioning reference signals is included in one or more system information blocks transmitted by a base station.

Clause 29. The method of clause 27 further comprising determining a null time gap in the schedule for the one or more demodulated reference signal bundles and transmitting the trigger signal to the user equipment in the null time gap.

Clause 30. The method of clause 27 wherein the trigger signal is transmitted via a downlink control information (DCI) signal or a medium access control (MAC) control element (CE).

Clause 31. An apparatus, comprising: at least one memory; at least one transceiver; at least one processor communicatively coupled to the at least one memory and the at least one transceiver, and configured to: receive an indication that a user equipment is configured to utilize demodulated reference signal bundling in uplink communications; determine a duration of a positioning session; provide an indication to suspend demodulated reference signal bundling for the duration of the positioning session; and obtain signal measurement values based on one or more uplink positioning reference signals transmitted by the user equipment during the positioning session.

Clause 32. The apparatus of clause 31 wherein the one or more uplink positioning reference signals include one or more sounding reference signals for positioning.

Clause 33. The apparatus of clause 31 wherein the at least one processor is further configured to receive the indication that the user equipment is configured to utilize demodulated reference signal bundling from the user equipment.

Clause 34. The apparatus of clause 31 wherein the at least one processor is further configured to receive the indication that the user equipment is configured to utilize demodulated reference signal bundling from a location management function.

Clause 35. The apparatus of clause 31 wherein the indication to suspend demodulated reference signal bundling includes an indication to suspend transmitting on a physical uplink shared channel for the duration of the positioning session.

Clause 36. An apparatus, comprising: at least one memory; at least one transceiver; at least one processor communicatively coupled to the at least one memory and the at least one transceiver, and configured to: receive an indication to perform a positioning session with a user equipment; fragment one or more demodulated reference signal bundles transmitted by the user equipment during the positioning session; and receive an uplink positioning reference signal from the user equipment within a fragment of the one or more demodulated reference signal bundles.

Clause 37. The apparatus of clause 36 wherein the uplink positioning reference signal is a sounding reference signal for positioning.

Clause 38. The apparatus of clause 36 wherein the at least one processor is further configured to suspend one or more transmissions on a physical uplink shared channel within a duration of the positioning session to fragment a demodulated reference signal bundle.

Clause 39. The apparatus of clause 38 wherein the at least one processor is further configured to receive the uplink positioning reference signal during a time period of a suspended transmission on the physical uplink shared channel.

Clause 40. The apparatus of clause 36 wherein the at least one processor is further configured to receive the indication to perform the positioning session from a location management function.

Clause 41. The apparatus of clause 36 wherein the at least one processor is further configured to suspend at least one demodulated reference signal bundle to fragment the one or more demodulated reference signal bundles.

Clause 42. An apparatus, comprising: at least one memory; at least one transceiver; at least one processor communicatively coupled to the at least one memory and the at least one transceiver, and configured to: determine a first transmit power for transmitting an uplink positioning reference signal; determine a second transmit power for transmitting a demodulated reference signal bundle; determine a common transmit power based at least in part on the first transmit power and the second transmit power, wherein the common transmit power is configured to maintain phase continuity in the demodulated reference signal bundle; and transmit the uplink positioning reference signal and the demodulated reference signal bundle with the common transmit power.

Clause 43. The apparatus of clause 42 wherein the uplink positioning reference signal is a sounding reference signal for positioning.

Clause 44. The apparatus of clause 42 wherein the at least one processor is further configured to receive uplink reference signal configuration information including an indication of the first transmit power.

Clause 45. The apparatus of clause 44 wherein the at least one processor is further configured to receive the uplink reference signal configuration information from a location management function.

Clause 46. The apparatus of clause 44 wherein the indication of the first transmit power includes an uncertainty value associated with the first transmit power.

Clause 47. The apparatus of clause 42 wherein the at least one processor is further configured to receive demodulated reference signal bundle configuration information including an indication of the second transmit power.

Clause 48. The apparatus of clause 47 wherein the at least one processor is further configured to receive the demodulated reference signal bundle configuration information from a base station.

Clause 49. The apparatus of clause 47 wherein the indication of the second transmit power include an uncertainty value associated with the second transmit power.

Clause 50. The apparatus of clause 42 wherein the first transmit power and the second transmit power are equal to the common transmit power.

Clause 51. An apparatus, comprising: at least one memory; at least one transceiver; at least one processor communicatively coupled to the at least one memory and the at least one transceiver, and configured to: providing demodulated reference signal bundling configuration information to a user equipment; receive a positioning session request from a location server; determine a status of signals within demodulated reference signal bundles transmitted by the user equipment; transmit an uplink cancellation indication to the user equipment based at least in part on the status of the signals; and receive one or more uplink positioning reference signals from the user equipment.

Clause 52. The apparatus of clause 51 wherein the one or more uplink positioning reference signals includes a sounding reference signal for positioning.

Clause 53. The apparatus of clause 51 wherein the at least one processor is further configured to provide one or more signals to the user equipment to enable uplink cancellation indication downlink control information (ULCI DCI) monitoring.

Clause 54. The apparatus of clause 51 wherein the at least one processor is further configured to determine a number of uplink slots in the demodulated reference signal bundles that are within a time period indicated in the positioning session request.

Clause 55. The apparatus of clause 54 wherein the at least one processor is further configured to transmit the uplink cancellation indication based at least in part on the number of uplink slots in the demodulated reference signal bundles that are within the time period.

Clause 56. The apparatus of clause 51 wherein the positioning session request includes an indication of a stringent time period, and the at least one processor is further configured to transmit the uplink cancellation indication based at least in part on the indication of the stringent time period.

Clause 57. An apparatus, comprising: at least one memory; at least one transceiver; at least one processor communicatively coupled to the at least one memory and the at least one transceiver, and configured to: receive a positioning session request associated with a user equipment; determine a schedule for one or more demodulated reference signal bundles transmitted by the user equipment; provide a configuration for aperiodic transmissions of uplink positioning reference signals to the user equipment; and transmit a trigger signal to the user equipment based on the schedule for the one or more demodulated reference signal bundles, wherein the user equipment is configured to transmit an uplink positioning reference signal in response to receiving the trigger signal.

Clause 58. The apparatus of clause 57 wherein the configuration for aperiodic transmission or uplink positioning reference signals is included in one or more system information blocks transmitted by a base station.

Clause 59. The apparatus of clause 57 wherein the at least one processor is further configured to determine a null time gap in the schedule for the one or more demodulated reference signal bundles and transmit the trigger signal to the user equipment in the null time gap.

Clause 60. The apparatus of clause 57 wherein the at least one processor is further configured to transmit the trigger signal via a downlink control information (DCI) signal or a medium access control (MAC) control element (CE).

Clause 61. An apparatus for obtaining uplink positioning reference signal measurements, comprising: means for receiving an indication that a user equipment is configured to utilize demodulated reference signal bundling in uplink communications; means for determining a duration of a positioning session; means for providing an indication to suspend demodulated reference signal bundling for the duration of the positioning session; and means for obtaining signal measurement values based on one or more uplink positioning reference signals transmitted by the user equipment during the positioning session.

Clause 62. An apparatus for receiving uplink positioning reference signals, comprising: means for receiving an indication to perform a positioning session with a user equipment; means for fragmenting one or more demodulated reference signal bundles transmitted by the user equipment during the positioning session; and means for receiving an uplink positioning reference signal from the user equipment within a fragment of the one or more demodulated reference signal bundles.

Clause 63. An apparatus for transmitting positioning reference signals and demodulated reference signal bundles, comprising: means for determining a first transmit power for transmitting an uplink positioning reference signal; means for determining a second transmit power for transmitting a demodulated reference signal bundle; means for determining a common transmit power based at least in part on the first transmit power and the second transmit power, wherein the common transmit power is configured to maintain phase continuity in the demodulated reference signal bundle; and means for transmitting the uplink positioning reference signal and the demodulated reference signal bundle with the common transmit power.

Clause 64. An apparatus for receiving uplink positioning reference signals, comprising: means for providing demodulated reference signal bundling configuration information to a user equipment; means for receiving a positioning session request from a location server; means for determining a status of signals within demodulated reference signal bundles transmitted by the user equipment; means for transmitting an uplink cancellation indication to the user equipment based at least in part on the status of the signals; and means for receiving one or more uplink positioning reference signals from the user equipment.

Clause 65. An apparatus for configuring aperiodic uplink positioning reference signals, comprising: means for receiving a positioning session request associated with a user equipment; means for determining a schedule for one or more demodulated reference signal bundles transmitted by the user equipment; means for providing a configuration for aperiodic transmissions of uplink positioning reference signals to the user equipment; and means for transmitting a trigger signal to the user equipment based on the schedule for the one or more demodulated reference signal bundles, wherein the user equipment is configured to transmit an uplink positioning reference signal in response to receiving the trigger signal.

Clause 66. A non-transitory processor-readable storage medium comprising processor-readable instructions configured to cause one or more processors to obtain uplink positioning reference signal measurements, comprising code for: receiving an indication that a user equipment is configured to utilize demodulated reference signal bundling in uplink communications; determining a duration of a positioning session; providing an indication to suspend demodulated reference signal bundling for the duration of the positioning session; and obtaining signal measurement values based on one or more uplink positioning reference signals transmitted by the user equipment during the positioning session.

Clause 67. A non-transitory processor-readable storage medium comprising processor-readable instructions configured to cause one or more processors to receive uplink positioning reference signals, comprising code for: receiving an indication to perform a positioning session with a user equipment; fragmenting one or more demodulated reference signal bundles transmitted by the user equipment during the positioning session; and receiving an uplink positioning reference signal from the user equipment within a fragment of the one or more demodulated reference signal bundles.

Clause 68. A non-transitory processor-readable storage medium comprising processor-readable instructions configured to cause one or more processors to transmit positioning reference signals and demodulated reference signal bundles, comprising code for: determining a first transmit power for transmitting an uplink positioning reference signal; determining a second transmit power for transmitting a demodulated reference signal bundle; determining a common transmit power based at least in part on the first transmit power and the second transmit power, wherein the common transmit power is configured to maintain phase continuity in the demodulated reference signal bundle; and transmitting the uplink positioning reference signal and the demodulated reference signal bundle with the common transmit power.

Clause 69. A non-transitory processor-readable storage medium comprising processor-readable instructions configured to cause one or more processors to receive uplink positioning reference signals, comprising code for: providing demodulated reference signal bundling configuration information to a user equipment; receiving a positioning session request from a location server; determining a status of signals within demodulated reference signal bundles transmitted by the user equipment; transmitting an uplink cancellation indication to the user equipment based at least in part on the status of the signals; and receiving one or more uplink positioning reference signals from the user equipment.

Clause 70. A non-transitory processor-readable storage medium comprising processor-readable instructions configured to cause one or more processors to configuring aperiodic uplink positioning reference signals, comprising code for: receiving a positioning session request associated with a user equipment; determining a schedule for one or more demodulated reference signal bundles transmitted by the user equipment; providing a configuration for aperiodic transmissions of uplink positioning reference signals to the user equipment; and transmitting a trigger signal to the user equipment based on the schedule for the one or more demodulated reference signal bundles, wherein the user equipment is configured to transmit an uplink positioning reference signal in response to receiving the trigger signal.

The invention claimed is:

1. A method for transmitting positioning reference signals and demodulated reference signal bundles, comprising:

determining a first transmit power for transmitting an uplink positioning reference signal;

determining a second transmit power for transmitting a demodulated reference signal bundle;

determining a common transmit power based on the first transmit power, the second transmit power, and an uncertainty value associated with the first transmit power or the second transmit power, wherein the common transmit power is configured to maintain phase continuity in the demodulated reference signal bundle; and transmitting the uplink positioning reference signal and the demodulated reference signal bundle based on the determined common transmit power.

2. The method of claim 1, wherein the uplink positioning reference signal is a sounding reference signal for positioning.

3. The method of claim 1, wherein determining the first transmit power includes:

receiving uplink reference signal configuration information including an indication of the first transmit power.

4. The method of claim 3, further comprising:

receiving the uplink reference signal configuration information from a location management function.

5. The method of claim 3, wherein the indication of the first transmit power includes the uncertainty value associated with the first transmit power.

6. The method of claim 1, wherein determining the second transmit power includes:

receiving demodulated reference signal bundle configuration information including an indication of the second transmit power.

7. The method of claim 6, further comprising:

receiving the demodulated reference signal bundle configuration information from a base station.

8. The method of claim 6, wherein the indication of the second transmit power includes the uncertainty value associated with the second transmit power.

9. The method of claim 1, wherein the first transmit power and the second transmit power are equal to the common transmit power.

10. The method of claim 1, wherein determining the common transmit power based on the first transmit power, the second transmit power, and the uncertainty value associated with the first transmit power or the second transmit power comprises:

determining a first range based on the first transmit power and the uncertainty value associated with the first transmit power;

determining a second range based on the second transmit power and a second uncertainty value associated with the second transmit power; and determining the common transmit power based on the first range and the second range.

11. The method of claim 10, wherein the first range defines a first set of transmit power conditions, wherein the second range defines a second set of transmit power conditions, wherein the common transmit power satisfies the first set of transmit power conditions and the second set of transmit power conditions.

12. An apparatus, comprising:

at least one memory;

at least one transceiver; and at least one processor communicatively coupled to the at least one memory and the at least one transceiver, and configured to:

determine a first transmit power for transmitting an uplink positioning reference signal;

determine a second transmit power for transmitting a demodulated reference signal bundle;

determine a common transmit power based on the first transmit power, the second transmit power, and an uncertainty value associated with the first transmit power or the second transmit power, wherein the common transmit power is configured to maintain phase continuity in the demodulated reference signal bundle; and transmit the uplink positioning reference signal and the demodulated reference signal bundle with the common transmit power.

13. The apparatus of claim 12, wherein the uplink positioning reference signal is a sounding reference signal for positioning.

14. The apparatus of claim 12, wherein the at least one processor is further configured to:

receive uplink reference signal configuration information including an indication of the first transmit power.

15. The apparatus of claim 14, wherein the at least one processor is further configured to:

receive the uplink reference signal configuration information from a location management function.

16. The apparatus of claim 14, wherein the indication of the first transmit power includes the uncertainty value associated with the first transmit power.

17. The apparatus of claim 12, wherein the at least one processor is further configured to:

receive demodulated reference signal bundle configuration information including an indication of the second transmit power.

18. The apparatus of claim 17, wherein the at least one processor is further configured to:

receive the demodulated reference signal bundle configuration information from a base station.

19. The apparatus of claim 17, wherein the indication of the second transmit power includes the uncertainty value associated with the second transmit power.

20. The apparatus of claim 12, wherein the first transmit power and the second transmit power are equal to the common transmit power.

21. An apparatus for transmitting positioning reference signals and demodulated reference signal bundles, the apparatus comprising:

means for determining a first transmit power for transmitting an uplink positioning reference signal;

means for determining a second transmit power for transmitting a demodulated reference signal bundle;

means for determining a common transmit power based on the first transmit power, the second transmit power, and an uncertainty value associated with the first transmit power or the second transmit power, wherein the common transmit power is configured to maintain phase continuity in the demodulated reference signal bundle; and means for transmitting the uplink positioning reference signal and the demodulated reference signal bundle with the common transmit power.

22. The apparatus of claim 21, wherein the uplink positioning reference signal is a sounding reference signal for positioning.

23. The apparatus of claim 21, wherein the means for determining the first transmit power includes:

means for receiving uplink reference signal configuration information including an indication of the first transmit power.

24. The apparatus of claim 23, further comprising:

means for receiving the uplink reference signal configuration information from a location management function.

25. The apparatus of claim 23, wherein the indication of the first transmit power includes the uncertainty value associated with the first transmit power.

26. The apparatus of claim 21, wherein the means for determining the second transmit power includes:

means for receiving demodulated reference signal bundle configuration information including an indication of the second transmit power.

27. The apparatus of claim 26, further comprising:

means for receiving the demodulated reference signal bundle configuration information from a base station.

28. The apparatus of claim 26, wherein the indication of the second transmit power includes the uncertainty value associated with the second transmit power.

29. The apparatus of claim 21, wherein the first transmit power and the second transmit power are equal to the common transmit power.

30. A non-transitory, processor-readable storage medium comprising processor-readable instructions configured to cause at least one processor of an apparatus, for transmitting positioning reference signals and demodulated reference signal bundles, to:

determine a first transmit power for transmitting an uplink positioning reference signal;

determine a second transmit power for transmitting a demodulated reference signal bundle;

determine a common transmit power based on the first transmit power, the second transmit power, and an uncertainty value associated with the first transmit power or the second transmit power, wherein the common transmit power is configured to maintain phase continuity in the demodulated reference signal bundle; and transmit the uplink positioning reference signal and the demodulated reference signal bundle with the common transmit power.

* * * * *